(12) United States Patent
Li et al.

(10) Patent No.: US 10,080,139 B2
(45) Date of Patent: Sep. 18, 2018

(54) INFORMATION SENDING METHOD AND APPARATUS, TERMINAL DEVICE, AND SYSTEM

(71) Applicant: Huawei Technologies Co., Ltd., Shenzhen (CN)

(72) Inventors: Ru Li, Shenzhen (CN); Huangwei Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/514,775

(22) PCT Filed: Jun. 15, 2015

(86) PCT No.: PCT/CN2015/081447
§ 371 (c)(1),
(2) Date: Mar. 27, 2017

(87) PCT Pub. No.: WO2016/201600
PCT Pub. Date: Dec. 22, 2016

(65) Prior Publication Data
US 2017/0230834 A1   Aug. 10, 2017

(51) Int. Cl.
*H04W 12/12* (2009.01)
*H04W 4/14* (2009.01)
*H04L 29/08* (2006.01)

(52) U.S. Cl.
CPC ........... *H04W 12/12* (2013.01); *H04L 67/141* (2013.01); *H04L 67/143* (2013.01); *H04W 4/14* (2013.01)

(58) Field of Classification Search
CPC ...... H04W 12/12; H04W 4/14; H04L 67/141; H04L 67/143

(Continued)

(56) References Cited

U.S. PATENT DOCUMENTS 7,855,975 B2 * 12/2010 Neugebauer ........ H04L 43/0864
370/230
8,706,279 B2 * 4/2014 Cho .................. H04M 1/72533
455/3.06

(Continued)

FOREIGN PATENT DOCUMENTS

CN        101807273 A     8/2010
CN        103078892 A     5/2013
EP          2525594 A1    11/2012

OTHER PUBLICATIONS

Mulliner, Collin et al.; "SMS-Based One-Time Passwords: Attacks and Defense (Short Paper)"; 2013, 10 pages, Springer-Verlag Berlin Heidelberg.

(Continued)

*Primary Examiner* — Cong Tran
(74) *Attorney, Agent, or Firm* — Slater Matsil, LLP

(57) ABSTRACT

An information sending method includes receiving, by a first application, request information sent by a second application, where the request information carries association information of the second application, the first application is running in a first operating system, the second application is running in a second operating system, the first operating system includes a first network interface, and the second operating system includes a second network interface. The method also includes receiving, by the first application, a first message from an external network by using the first network interface; and extracting, by the first application, first information from the first message according to the association information of the second application, and sending the first information to the second application, so that the second application sends, by using the second network interface, the first information to an application server corresponding to the second application.

20 Claims, 9 Drawing Sheets

(58) Field of Classification Search
USPC ............ 455/410, 412.1–412.2, 414.1–414.2, 455/404.2
See application file for complete search history.

(56) References Cited

U.S. PATENT DOCUMENTS

| | | | |
|---|---|---|---|
| 2002/0025832 A1* | 2/2002 | Durian | B60R 11/0241 455/557 |
| 2002/0032042 A1* | 3/2002 | Poplawsky | B60R 11/0241 455/564 |
| 2011/0065426 A1 | 3/2011 | Bae et al. | |
| 2014/0101310 A1* | 4/2014 | Savage | G06Q 10/10 709/224 |
| 2014/0179297 A1* | 6/2014 | Sahoo | H04W 4/18 455/418 |
| 2015/0065183 A1 | 3/2015 | Wang et al. | |
| 2015/0163654 A1* | 6/2015 | Lew | H04W 4/02 455/404.2 |
| 2016/0048114 A1* | 2/2016 | Matthieu | G05B 15/02 700/83 |
| 2016/0366082 A1* | 12/2016 | Ross | H04L 67/10 |

OTHER PUBLICATIONS

Globalplatform, Inc., TEE Internal API Specification, Version 1.0, Dec. 2011, 202 pages.

\* cited by examiner

INFORMATION SENDING METHOD AND APPARATUS, TERMINAL DEVICE, AND SYSTEM

CROSS-REFERENCE TO RELATED APPLICATIONS

This application is a national stage of International Application No. PCT/CN2015/081447, filed on Jun. 15, 2015, which is hereby incorporated by reference in its entirety.

TECHNICAL FIELD

The present invention relates to the field of computer application technologies, and in particular, to an information sending method and apparatus, a terminal device, and a system.

BACKGROUND

With development of terminals, people gradually focus on security issues. The security issues involve aspects such as security protection, enterprise environment, connection security, and mobile payment. It is difficult to guard against a mobile payment type Trojan horse because the Trojan horse may be disguised as different applications to trick users into downloading and installing the applications. In addition, fraud short message service (SMS) messages and mobile phone loss also pose a threat to terminal security.

With occurrence of various security problems, a login password already cannot satisfy an operation having a high security risk. Application developers generally protect login and sensitive operations of applications by means of two-factor authentication, and using an SMS verification code is a most common way. A main objective of the SMS verification code is identity identification. In a Rich (Rich Operation System, a rich operating system having a strong processing capability and multimedia function, such as Android™ or iOS™) environment, an application may apply for an SMS permission, to read all SMS messages in the Rich environment and obtain SMS verification codes from the messages. SMS listening requires the following SMS permissions: a permission of reading an SMS message, a permission of processing a read SMS message, a permission of sending an SMS message, and a permission of editing an SMS message. Android™ mobile phone viruses can obtain the SMS permissions, to intercept and forward SMS verification codes for stealing by stealers. Even though login and sensitive operations of applications are protected by means of two-factor authentication, operation security is still relatively low.

SUMMARY

Embodiments of the present invention provide an information sending method and apparatus, a terminal device, and a system, so that a second application can obtain first information when an information permission is disabled.

A first aspect of the present invention provides an information sending method, where the method is applied to a terminal device including a first operating system and a second operating system, a first application is running in the first operating system, the first operating system includes a first network interface, a second application is running in the second operating system, and the second operating system includes a second network interface, including receiving, by the first application, request information sent by the second application, where the request information carries association information of the second application and receiving, by the first application, a first message from an external network by using the first network interface. The method also includes extracting, by the first application, first information from the first message according to the association information of the second application, and sending the first information to the second application, so that the second application sends, by using the second network interface, the first information to an application server corresponding to the second application.

In a first possible implementation manner, the receiving, by the first application, request information sent by the second application, where the request information carries association information of the second application includes: receiving, by the first application, request information sent by a third application corresponding to the second application, where the request information carries association information of the third application.

With reference to the first possible implementation manner of the first aspect, in a second possible implementation manner, the sending, by the first application, the first information to the second application includes: sending, by the first application, the first information to the third application, so that the third application sends, by using a third network interface, the first information to an application server corresponding to the third application, where the first operating system further includes the third network interface.

With reference to the first possible implementation manner of the first aspect, in a third possible implementation manner, the sending, by the first application, the first information to the third application includes: sending, by the first application, the first information to the third application, so that the third application sends, by using the third network interface, the first information to the application server corresponding to the third application, the application server corresponding to the third application verifies the first information and sends verification response information to the third application, and the third application performs a payment operation according to the verification response information.

With reference to the possible implementation manner of the first aspect, in a fourth possible implementation manner, before the receiving, by the first application, request information sent by the second application, the method further includes: establishing, by the first application, a session connection between the first application and the second application; and after the sending, by the first application, the first information to the second application, the method further includes: disrupting, by the first application, the session connection between the first application and the second application.

With reference to the fourth possible implementation manner of the first aspect, in a fifth possible implementation manner, the first operating system is a trusted execution environment (TEE); and the establishing, by the first application, a session connection between the first application and the second application includes: establishing, by the first application, the session connection between the first application and the second application by using a TEE Client application programming interface (API).

With reference to the fourth or fifth possible implementation manner of the first aspect, in a sixth possible implementation manner, the sending, by the first application, the first information to the second application includes: sending, by the first application, the first information to the second application, so that the second application sends, by using_ the second network interface, the first information to the application server corresponding to the second application, the application server corresponding to the second application verifies the first information and sends verification response information to the second application, and the second application performs a login operation according to the verification response information.

With reference to the first aspect or any one of the first to sixth possible implementation manners of the first aspect, in a seventh possible implementation manner, the method further includes: determining, by the first application, whether a second message from the external network is received by using the first network interface; and when the second message is received, sending, by the first application, the second message to a fourth application, where the fourth application is running in the second operating system.

With reference to the seventh possible implementation manner of the first aspect, in an eighth possible implementation manner, the determining, by the first application, whether a second message from the external network is received by using the first network interface includes: after the request information sent by the second application is received, determining, by the first application, whether the second message is received by using the first network interface.

With reference to the first aspect or any one of the first to eighth possible implementation manners of the first aspect, in a ninth possible implementation manner, the request information carries information about a preset time threshold; and the receiving, by the first application, a first message from an external network by using the first network interface includes: receiving, by the first application by using the first network interface, an SMS message that is sent from the external network within the preset time threshold.

A second aspect of the present invention provides a computer storage medium, where the computer storage medium stores a program, and when executed, the program performs all or some steps of the information sending method provided in the first aspect of the embodiments of the present invention.

A third aspect of the present invention provides an information receiving method, where the method is applied to a terminal device including a first operating system and a second operating system, a first application is running in the first operating system, the first operating system includes a first network interface, a second application is running in the second operating system, and the second operating system includes a second network interface, including sending, by the second application, request information to the first application, where the request information carries association information of the second application, so that the first application receives a first message from an external network by using the first network interface, and the first application extracts first information from the first message according to the association information of the second application, and sends the first information to the second application. The method also includes receiving, by the second application, the first information sent by the first application; and sending, by the second application by using the second network interface, the first information to an application server corresponding to the second application.

In a first possible implementation manner, the sending, by the second application, request information to the first application includes: establishing, by the second application, a session connection between the second application and a corresponding third application, so that the third application sends request information to the first application, where the request information carries association information of the third application, and the third application is running in the first operating system.

With reference to the possible implementation manner of the third aspect, in a second possible implementation manner, the sending, by the second application, request information to the first application includes: establishing, by the second application, a session connection between the second application and a corresponding third application, so that the third application sends request information to the first application, where the request information carries association information of the third application, the first application extracts the first information from the first message according to the association information of the third application, and sends the first information to the third application, and the third application sends, by using a third network interface, the first information to an application server corresponding to the third application, where the first operating system further includes the third network interface.

With reference to the possible implementation manner of the third aspect, in a third possible implementation manner, the sending, by the second application, request information to the first application includes: establishing, by the second application, a session connection between the second application and a corresponding third application, so that the third application sends request information to the first application, where the request information carries association information of the third application, the first application extracts the first information from the first message according to the association information of the third application, and sends the first information to the third application, the third application sends, by using a third network interface, the first information to an application server corresponding to the third application, the application server corresponding to the third application verifies the first information and sends verification response information to the third application, and the third application performs a payment operation according to the verification response information.

With reference to the possible implementation manner of the third aspect, in a fourth possible implementation manner, before the sending, by the second application, request information to the first application, establish, by the second application, a session connection between the first application and the second application; and after the receiving, by the second application, the first information sent by the first application, the method further includes: disrupting, by the second application, the session connection between the first application and the second application.

With reference to the fourth possible implementation manner of the third aspect, in a fifth possible implementation manner, the first operating system is a TEE; and the establishing, by the second application, a session connection between the first application and the second application includes: establishing, by the second application, the session connection between the first application and the second application by using a TEE Client API.

With reference to the fourth or fifth possible implementation manner of the third aspect, in a sixth possible implementation manner, the sending, by the second application by using the second network interface, the first information to an application server corresponding to the second application includes: sending, by the second application by using the second network interface, the first information to the application server corresponding to the second application, so that the application server corresponding to the second application verifies the first information and sends verification response information to the second application, and the second application performs a login operation according to the verification response information.

A fourth aspect of the present invention provides a computer storage medium, where the computer storage medium stores a program, and when executed, the program performs all or some steps of the information receiving method provided in the third aspect of the embodiments of the present invention.

A fifth aspect of the present invention provides an information sending apparatus, including: a request information receiving module, configured to receive request information sent by a second application, where the request information carries association information of the second application, the information sending apparatus is running in a first operating system, the first operating system includes a first network interface, the second application is running in a second operating system, and the second operating system includes a second network interface; a message receiving module, configured to receive a first message from an external network by using the first network interface; and an information sending module, configured to extract first information from the first message according to the association information of the second application, and send the first information to the second application, so that the second application sends, by using the second network interface, the first information to an application server corresponding to the second application.

In a first possible implementation manner, the request information receiving module is specifically configured to receive request information sent by a third application corresponding to the second application, where the request information carries association information of the third application, and the third application is running in the first operating system.

With reference to the first possible implementation manner of the fifth aspect, in a second possible implementation manner, the information sending module sends the first information to the third application, and is specifically configured to send the first information to the third application, so that the third application sends, by using a third network interface, the first information to an application server corresponding to the third application, where the first operating system further includes the third network interface.

With reference to the first possible implementation manner of the fifth aspect, in a third possible implementation manner, the information sending module sends the first information to the third application, and is specifically configured to send the first information to the third application, so that the third application sends, by using a third network interface, the first information to an application server corresponding to the third application, the application server corresponding to the third application verifies the first information and sends verification response information to the third application, and the third application performs a payment operation according to the verification response information.

With reference to the possible implementation manner of the fifth aspect, in a fourth possible implementation manner, the apparatus further includes: a connection establishment module, configured to: before the request information receiving module receives the request information sent by the second application, establish a session connection between the apparatus and the second application; and a connection disruption module, configured to: after the information sending module sends the first information to the second application, disrupt the session connection between the apparatus and the second application.

With reference to the fourth possible implementation manner of the fifth aspect, in a fifth possible implementation manner, the first operating system is a TEE; and the connection establishment module is specifically configured to establish the session connection between the apparatus and the second application by using a TEE Client API.

With reference to the fourth or fifth possible implementation manner of the fifth aspect, in a sixth possible implementation manner, the information sending module sends the first information to the third application, and is specifically configured to send the first information to the second application, so that the second application sends, by using the second network interface, the first information to the application server corresponding to the second application, the application server corresponding to the second application verifies the first information and sends verification response information to the second application, and the second application performs a login operation according to the verification response information.

With reference to the fifth aspect or any one of the first to sixth possible implementation manners of the fifth aspect, in a seventh possible implementation manner, the apparatus further includes: a determining module, configured to determine whether a second message from the external network is received by using the first network interface; and a message sending module, configured to: when the determining module determines that the second message is received, send the second message to a fourth application, where the fourth application is running in the second operating system.

With reference to the seventh possible implementation manner of the fifth aspect, in an eighth possible implementation manner, the determining module is specifically configured to: after the request information receiving module receives the request information sent by the second application, determine whether the second message is received by using the first network interface.

With reference to the fifth aspect or any one of the first to eighth possible implementation manners of the fifth aspect, in a ninth possible implementation manner, the request information carries information about a preset time threshold; and the message receiving module is specifically configured to receive, by using the first network interface, the first message that is sent from the external network within the preset time threshold.

A sixth aspect of the present invention provides a terminal device, including a processor, a memory, a first operating system, and a second operating system, where the processor is running in the first operating system, the first operating system includes a first network interface, a second application is running in the second operating system, the second operating system includes a second network interface, the memory stores a set of program code, and the processor invokes the program code stored in the memory, to execute the following operations: receiving request information sent by the second application, where the request information carries association information of the second application; receiving a first message from an external network by using the first network interface; and extracting first information from the first message according to the association information of the second application, and sending the first information to the second application, so that the second application sends, by using the second network interface, the first information to an application server corresponding to the second application.

A seventh aspect of the present invention provides an information receiving apparatus, including: a request information sending module, configured to send request information to a first application, where the request information carries association information of the information receiving apparatus, so that the first application receives a first message from an external network by using a first network interface, and the first application extracts first information from the first message according to the association information of the information receiving apparatus, and sends the first information to the information receiving module, where the first application is running in a first operating system, the first operating system includes the first network interface, the information receiving apparatus is running in a second operating system, and the second operating system includes a second network interface; the information receiving module, configured to receive the first information sent by the first application; and a first-information sending module, configured to send, by using the second network interface, the first information to an application server corresponding to the information receiving apparatus.

In a first possible implementation manner, the request information sending module is specifically configured to establish a session connection between the apparatus and a corresponding third application, so that the third application sends request information to the first application, where the request information carries association information of the third application, and the third application is running in the first operating system.

With reference to the possible implementation manner of the seventh aspect, in a second possible implementation manner, the request information sending module is specifically configured to establish a session connection between the apparatus and a corresponding third application, so that the third application sends request information to the first application, where the request information carries association information of the third application, the first application extracts the first information from the first message according to the association information of the third application, and sends the first information to the third application, and the third application sends, by using a third network interface, the first information to an application server corresponding to the third application, where the first operating system further includes the third network interface.

With reference to the possible implementation manner of the seventh aspect, in a third possible implementation manner, the request information sending module is specifically configured to establish a session connection between the apparatus and a corresponding third application, so that the third application sends request information to the first application, where the request information carries association information of the third application, the first application extracts the first information from the first message according to the association information of the third application, and sends the first information to the third application, the third application sends, by using a third network interface, the first information to an application server corresponding to the third application, the application server corresponding to the third application verifies the first information and sends verification response information to the third application, and the third application performs a payment operation according to the verification response information.

With reference to the possible implementation manner of the seventh aspect, in a fourth possible implementation manner, the apparatus further includes: a connection establishment module, configured to: before the request information sending module sends the request information to the first application, establish a session connection between the apparatus and the first application; and a connection disruption module, configured to: after the information receiving module receives the first information sent by the first application, disrupt the session connection between the apparatus and the first application.

With reference to the fourth possible implementation manner of the seventh aspect, in a fifth possible implementation manner, the first operating system is a TEE; and the connection establishment module is specifically configured to establish the session connection between the apparatus and the first application by using a TEE Client API.

With reference to the fourth or fifth possible implementation manner of the seventh aspect, in a sixth possible implementation manner, the first-information sending module is specifically configured to send, by using the second network interface, the first information to the application server corresponding to the second application, so that the application server corresponding to the second application verifies the first information and sends verification response information to the second application, and the second application performs a login operation according to the verification response information.

An eighth aspect of the present invention provides a terminal device, including a processor, a memory, a first operating system, and a second operating system, where the processor is running in the second operating system, the second operating system includes a second network interface, a first application is running in the first operating system, the first operating system includes a first network interface, the memory stores a set of program code, and the processor invokes the program code stored in the memory, to execute the following operations: sending request information to the first application, where the request information carries association information of the processor, so that the first application receives a first message from an external network by using the first network interface, and the first application extracts first information from the first message according to the association information of the processor, and sends the first information to the processor; receiving the first information sent by the first application; and sending, by using the second network interface, the first information to an application server corresponding to the processor.

A ninth aspect of the present invention provides a communications system, including: the information sending apparatus in the fifth aspect and the information receiving apparatus in the seventh aspect, where the information receiving apparatus is configured to send request information to the information sending apparatus, where the request information carries association information of the information receiving apparatus; the information sending apparatus is configured to receive a first message from an external network; the information sending apparatus is further configured to extract first information from the first message according to the association information of the information receiving apparatus, and send the first information to the information receiving apparatus; and the information receiving apparatus is further configured to send the first information to an application server corresponding to the information receiving apparatus.

In the embodiments of the present invention, a first application receives request information sent by a second application, where the request information carries association information of the second application; the first application receives a first message from an external network by using a first network interface; and the first application extracts first information from the first message according to the association information of the second application, and sends the first information to the second application, so that the second application sends, by using a second network interface, the first information to an application server corresponding to the second application. In this way, the second application can obtain the first information when an information permission is disabled.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
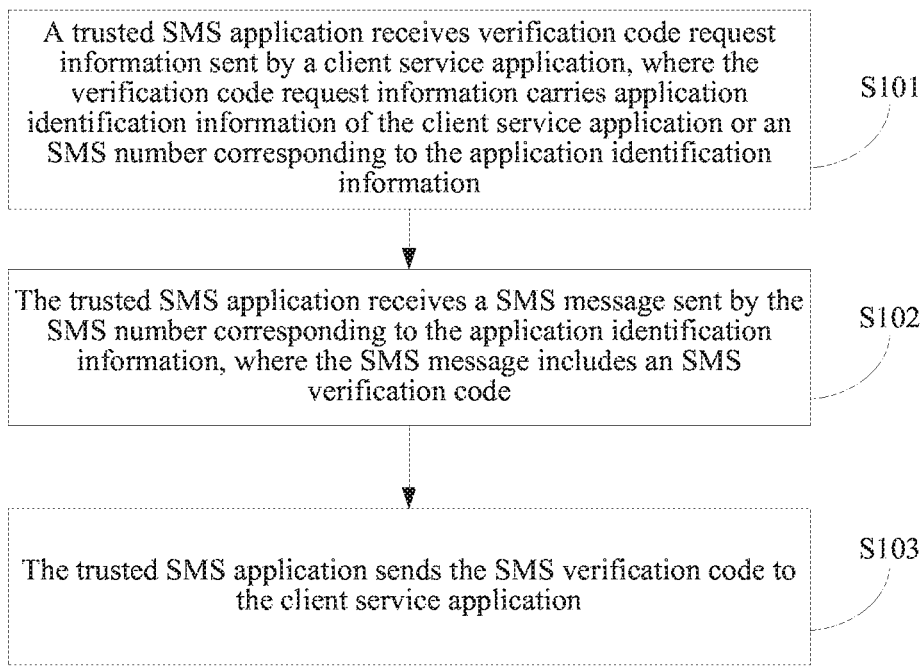
FIG. 1 is a schematic flowchart of an information sending method according to a first embodiment of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

An existing information sending method is running in a Rich environment. In the Rich environment, a short message service (SMS) permission is in an enabled state, and a client service application may apply for the SMS permission. Then the Rich environment provides, to the client service application, a permission of reading all SMS messages in a client SMS application. When the client SMS application receives an SMS message, a Rich system sends broadcast information used to indicate that the SMS message is received, and the client service application having the permission of reading an SMS message may read the SMS message received by the client SMS application, to obtain an SMS verification code in the SMS message. The Rich environment has a relatively low security level, and a malicious application may obtain the SMS permission by using a virus, a Trojan horse, a phishing website, or the like, to read the SMS verification code in the client SMS application, resulting in leakage of security information and relatively low operation security.

Embodiments of the present invention provide an information sending method. A trusted SMS application receives verification code request information sent by a client service application. The verification code request information carries application identification information of the client service application or an SMS number corresponding to the application identification information. The trusted SMS application receives an SMS message sent by the SMS number corresponding to the application identification information. The SMS message includes an SMS verification code. and the trusted SMS application sends the SMS verification code to the client service application. In this way, the client service application can obtain the SMS verification code when an SMS permission is disabled, and operation security is improved.

Mentioned in the embodiments of the present invention, the trusted SMS application is running in a first operating system, the client service application is running in a second operating system, and the first operating system has a higher security level than the second operating system. The first operating system may be a TEE environment (Trusted Executive Environment, a trusted operating system (TrustOS) having a security processing capability and providing a secure peripheral operation), and the second operating system may be the Rich environment. The TEE environment and the Rich environment are mutually independent executive environments, the TEE environment provides a security service to the Rich environment, and the TEE environment also provides confidentiality, integrity, and access permission control of resources and data thereof. In the embodiments of the present invention, an SMS permission is disabled, that is, the client service application does not have a permission of reading an SMS message, and after receiving an SMS message including an SMS verification code, the trusted SMS application sends the SMS verification code to the client service application. Another application cannot obtain the SMS verification code. In this way, leakage of security information is avoided, and operation security can be improved.

The first operating system and the second operating system in the embodiments of the present invention have two work modes: 1. The first operating system is in a running state, and the second operating system is in a suspended state. The second operating system does not occupy memory and a CPU (Central Processing Unit) timeslot. Alternatively, the second operating system is in a running state, and the first operating system is in a suspended state, The first operating system does not occupy memory and a CPU timeslot. 2. The first operating system is in a running state, and the second operating system is in a running state. The first operating system is running in the foreground, and the second operating system is running in the background. Alternatively, the second operating system is running in the foreground, and the first operating system is running in the background.

Mentioned in the embodiments of the present invention, the trusted SMS application may be a first application, the client service application may be a second application, a trusted service application may be a third application, and the client SMS application may be a fourth application. The SMS message may be a first message, and the SMS verification code may be first information. Specific names are not limited in the embodiments of the present invention.

The information sending method mentioned in the embodiments of the present invention may be applied to a terminal such as a personal computer, a smart phone (for example, an Android™ mobile phone or an iOS™ mobile phone), a tablet computer, a palmtop computer, a mobile Internet device (MID), or a wearable smart device. Specific application is not limited in the embodiments of the present invention.

Referring to FIG. 1, FIG. 1 is a schematic flowchart of an information sending method according to a first embodiment of the present invention. As shown in the figure, the information sending method in this embodiment of the present invention may include the following steps.

S101: A trusted SMS application receives verification code request information sent by a client service application, where the verification code request information carries application identification information of the client service application or an SMS number corresponding to the application identification information.

A trusted SMS application may receive verification code request information sent by a client service application. The verification code request information carries application identification information of the client service application or an SMS number corresponding to the application identification information. The application identification information may be a UUID (Universally Unique Identifier), and is used to uniquely identify the client service application. The trusted SMS application is running in a first operating system, the client service application is running in a second operating system, the first operating system and the second operating system are mutually independent executive environments in a terminal, and the first operating system has a higher security level than the second operating system. The first operating system may be a TEE environment, and the second operating system may be a Rich environment. An application running in the Rich environment is a CA (Client Application), for example, the client service application. An application running in the TEE environment is a TA (Trusted Application), for example, the trusted SMS application.

In an optional embodiment, the trusted SMS application may receive verification code request information sent by a trusted service application corresponding to the client service application. The verification code request information carries application identification information of the trusted service application or an SMS number corresponding to the application identification information. In a specific implementation, when the client service application performs payment and other security operations, the terminal starts a trusted service application running in the first operating system, and the trusted service application sends verification code request information to the trusted SMS application.

For example, the client service application running in the second operating system corresponds to a trusted service application running in the first operating system. When the client service application performs a security operation, the client service application may send a session establishment request to the trusted service application, and the trusted service application establishes a session connection between the trusted service application and the client service application according to the session establishment request. The trusted service application sends verification code request information to the trusted SMS application. The verification code request information carries application identification information of the trusted service application or an SMS number corresponding to the application identification information. The trusted SMS application may receive the verification code request information.

Further optionally, before the trusted SMS application receives the verification code request information sent by the trusted service application, the trusted SMS application may receive the application identification information of the trusted service application and the SMS number that are sent by the trusted service application, establish a correspondence between the application identification information of the trusted service application and the SMS number, and store the application identification information of the trusted service application and the SMS number corresponding to the application identification information.

In an optional embodiment, before receiving the verification code request information sent by the client service application, the trusted SMS application may establish a session connection between the trusted SMS application and the client service application.

Further optionally, when the first operating system is the TEE environment, the trusted SMS application may establish the session connection between the trusted SMS application and the client service application by using a trusted operating system client application programming interface TEE Client API. In a specific implementation, the trusted SMS application may receive a session establishment request sent by the client service application, and establish the session connection between the trusted SMS application and the client service application according to the received session establishment request. The TEE Client API is an underlying communications interface, and the TEE Client API is designed so that a CA run in the Rich environment may interact with a TA run in the TEE environment, where the API is Application Programming Interface, and the API refers to an application programming interface.

Further optionally, before the trusted SMS application receives the verification code request information sent by the client service application, the trusted SMS application may receive the application identification information of the client service application and the SMS number that are sent by the client service application, establish a correspondence between the application identification information of the client service application and the SMS number, and store the application identification information of the client service application and the SMS number corresponding to the application identification information.

In an optional embodiment, after receiving the verification code request information sent by the client service application, the trusted SMS application may further determine whether a target SMS message sent by another SMS number other than the SMS number corresponding to the application identification information is received. When the target SMS message is received, the trusted SMS application may send the target SMS message to a client SMS application, so that the client SMS application receives and displays the target SMS message. The client SMS application is running in the second operating system.

Further optionally, before the trusted SMS application receives the verification code request information sent by the client service application, or after the trusted SMS application sends an SMS verification code to the client service application, the client SMS application may directly receive the target SMS message sent by the another SMS number other than the SMS number corresponding to the application identification information, and display the received target SMS message on a display screen. In this embodiment of the present invention, the client SMS application does not have a permission of reading an SMS verification code, but has a permission of reading another SMS message other than the SMS verification code. In this way, leakage of security information is avoided, and operation security is relatively high.

In a specific implementation, when the first operating system is in a suspended state and the second operating system is in a running state, the client SMS application may directly receive the target SMS message sent by the another SMS number other than the SMS number corresponding to the application identification information. Optionally, the client SMS application may further receive another SMS message sent by the SMS number corresponding to the application identification information, where the another SMS message does not include the SMS verification code, and for example, may include advertisement information or transaction information. When the client service application performs a security operation, the client service application sends a session establishment request to the trusted SMS application. The trusted SMS application establishes a session connection between the trusted SMS application and the client service application according to the session establishment request. In this case, the first operating system is switched to a running state, and the second operating system is switched to a suspended state. After the trusted SMS application sends the SMS verification code to the client service application, and the client service application receives the SMS verification code, the client service application sends a session disruption request to the trusted SMS application. The trusted SMS application disrupts the session connection between the trusted SMS application and the client service application according to the session disruption request. In this case, the first operating system is switched to a suspended state, and the second operating system is switched to a running state.

In an optional embodiment, the trusted SMS application may determine whether a target SMS message sent by another SMS number other than the SMS number corresponding to the application identification information is received. When the target SMS message is received, the trusted SMS application may send the target SMS message to a client SMS application, so that the client SMS application receives and displays the target SMS message. Further optionally, the trusted SMS application may further determine whether another SMS message sent by the SMS number corresponding to the application identification information is received. When the another SMS message sent by the SMS number corresponding to the application identification information is received, the trusted SMS application may send the another SMS message to the client SMS application.

For example, before receiving the verification code request information sent by the client service application, the trusted SMS application may determine whether a target SMS message sent by another SMS number other than the SMS number corresponding to the application identification information is received. When the target SMS message is received, the trusted SMS application may send the target SMS message to the client SMS application. For another example, after receiving the verification code request information sent by the client service application, before sending the SMS verification code to the client service application, the trusted SMS application may determine whether a target SMS message sent by another SMS number other than the SMS number corresponding to the application identification information is received. When the target SMS message is received, the trusted SMS application may send the target SMS message to the client SMS application. For another example, after sending the SMS verification code to the client service application, the trusted SMS application may determine whether a target SMS message sent by another SMS number other than the SMS number corresponding to the application identification information is received. When the target SMS message is received, the trusted SMS application may send the target SMS message to the client SMS application. In this embodiment of the present invention, the client SMS application does not have a permission of reading all SMS messages, and may receive only an SMS message forwarded by the trusted SMS application. In this way, operation security is relatively high.

In a specific implementation, the first operating system and the second operating system keep in a running state. Before the client SMS application establishes a session connection between the client SMS application and the trusted SMS application, work modes of the first operating system and the second operating system are: The second operating system is running in the foreground, and the first operating system is running in the background. After the client SMS application establishes the session connection between the client SMS application and the trusted SMS application, the work modes of the first operating system and the second operating system are switched to: The first operating system is running in the foreground, and the second operating system is running in the background. After the client SMS application disrupts the session connection between the client SMS application and the trusted SMS application, the work modes of the first operating system and the second operating system are switched to: The second operating system is running in the foreground, and the first operating system is running in the background.

S102: The trusted SMS application receives an SMS message sent by the SMS number corresponding to the application identification information, where the SMS message includes an SMS verification code.

After receiving the verification code request information, the trusted SMS application may receive an SMS message sent by the SMS number corresponding to the application identification information. The received SMS message may include an SMS verification code.

In an optional embodiment, the verification code request information may further carry information about a preset time threshold, and the trusted SMS application may receive an SMS message that is sent by the SMS number within the preset time threshold. In a specific implementation, the trusted SMS application may start time counting when the verification code request information is received, to determine whether an SMS message sent by the SMS number is received within the preset time threshold. When the SMS message sent by the SMS number is received within the preset time threshold, the trusted SMS application obtains an SMS verification code in the SMS message. When the SMS message sent by the SMS number is not received within the preset time threshold, the trusted SMS application may receive verification code request information re-sent by the client service application, and start time counting when the re-sent verification code request information is received, to determine whether an SMS message sent by the SMS number is received within the preset time threshold. When the SMS message sent by the SMS number is received within the preset time threshold, the trusted SMS application obtains an SMS verification code in the SMS message.

S103: The trusted SMS application sends the SMS verification code to the client service application.

After receiving the SMS message, the trusted SMS application may send the SMS verification code in the SMS message to the client service application.

In an optional embodiment, the trusted SMS application sends the SMS verification code to the trusted service application, so that the trusted service application receives the SMS verification code, and disrupts the session connection between the trusted service application and the client service application.

In an optional embodiment, the trusted SMS application sends the SMS verification code to the trusted service application, so that the trusted service application sends the SMS verification code to an application server corresponding to the trusted service application, the application server corresponding to the trusted service application verifies the SMS verification code, the application server corresponding to the trusted service application sends verification response information to the trusted service application, and the trusted service application performs a payment operation according to the verification response information. After the trusted service application executes the payment operation, the client service application may send a session disruption request to the trusted service application, and the trusted service application disrupts the session connection between the trusted service application and the client service application according to the session disruption request. In this embodiment of the present invention, the payment operation is executed in the TEE environment, and a malicious application cannot obtain security information, for example, an SMS verification code, an account (for example, a bank card number or an Alipay™ account), or an account password, by using a virus, a Trojan horse, a phishing website, or the like. In this way, operation security can be improved.

In an optional embodiment, after sending the SMS verification code to the client service application, the trusted SMS application may disrupt the session connection between the trusted SMS application and the client service application. In a specific implementation, after receiving the SMS verification code, the client service application may send a session disruption request to the trusted SMS application, and the trusted SMS application may disrupt the session connection between the trusted SMS application and the client service application according to the session disruption request.

In an optional embodiment, the trusted SMS application sends the SMS verification code to the client service application, so that the client service application sends the SMS verification code to an application server corresponding to the client service application, the application server corresponding to the client service application verifies the SMS verification code, the application server corresponding to the client service application sends verification response information to the client service application, and the client service application performs a login operation according to the verification response information. For example, the client service application is instant messaging software (for example, WeChat™ or QQ™) or an e-mail or entertainment application (for example, Douban™ or Meituan™), and the client service application may execute a login operation according to the SMS verification code.

In the information sending method shown in FIG. 1, a trusted SMS application receives verification code request information sent by a client service application. The verification code request information carries application identification information of the client service application or an SMS number corresponding to an application identifier, the trusted SMS application is running in a first operating system, the client service application is running in a second operating system, and the first operating system has a higher security level than the second operating system; the trusted SMS application receives an SMS message sent by the SMS number corresponding to the application identification information, where the SMS message includes an SMS verification code; and the trusted SMS application sends the SMS verification code to the client service application. In this way, the client service application can obtain the SMS verification code when an SMS permission is disabled, and operation security is improved.

Figure 2:
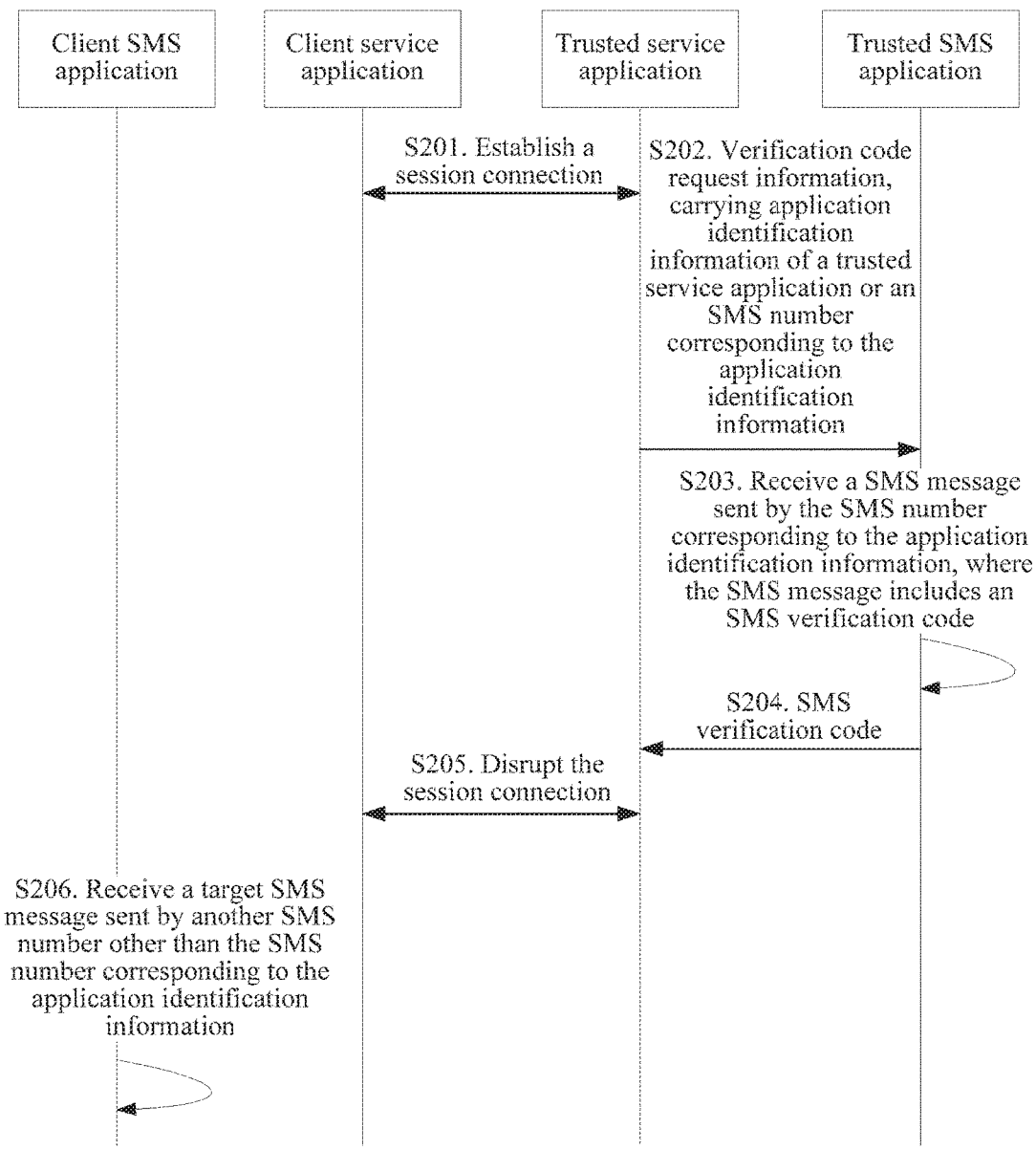
FIG. 2 is a schematic flowchart of an information sending method according to a second embodiment of the present invention.

Referring to FIG. 2, FIG. 2 is a schematic flowchart of an information sending method according to a second embodiment of the present invention. As shown in the figure, the information sending method in this embodiment of the present invention may include the following steps.

S201: A client service application establishes a session connection between the client service application and a trusted service application.

When performing a security operation, a client service application may send a session establishment request to a trusted service application, and the trusted service application establishes a session connection between the trusted service application and the client service application according to the session establishment request.

In a specific implementation, before the client service application establishes the session connection between the client service application and the trusted service application, a first operating system is in a suspended state, and a second operating system is in a running state. After the client service application establishes the session connection between the client service application and the trusted service application, the first operating system is switched to a running state, and the second operating system is switched to a suspended state. The first operating system and the second operating system are mutually independent executive environments, and the first operating system has a higher security level than the second operating system. Work modes of the first operating system and the second operating system may be: The first operating system is in a running state, and the second operating system is in a suspended state, where the second operating system does not occupy memory and a CPU timeslot. Optionally, the work modes of the first operating system and the second operating system may be: The second operating system is in a running state, and the first operating system is in a suspended state, where the first operating system does not occupy memory and a CPU timeslot.

In an optional embodiment, the client service application may establish the session connection between the client service application and the trusted service application by using a TEE Client API. For example, the client service application may access, by using the TEE Client API, the trusted service application running in the first operating system.

In an optional embodiment, after the client service application establishes the session connection between the client service application and the trusted service application, the first operating system is switched to a running state, the second operating system is switched to a suspended state, and a trusted SMS application may determine whether a target SMS message sent by another SMS number other than an SMS number corresponding to application identification information of the trusted service application is received. If a result of the determining is yes, the trusted SMS application sends the target SMS message to a client SMS application, so that the client SMS application receives the target SMS message, and displays the received target SMS message on a display screen. Optionally, the trusted SMS application may determine whether another SMS message sent by the SMS number corresponding to the application identification information is received, where the another SMS message does not include an SMS verification code, and for example, may include advertisement information or transaction information. If a result of the determining is yes, the trusted SMS application sends the another SMS message to the client SMS application, so that the client SMS application receives the another SMS message, and displays the received another SMS message on the display screen.

S202: The trusted service application sends verification code request information to a trusted SMS application, where the verification code request information carries application identification information of the trusted service application or an SMS number corresponding to the application identification information.

S203: The trusted SMS application receives an SMS message sent by the SMS number corresponding to the application identification information, where the SMS message includes an SMS verification code.

The trusted SMS application may receive, according to the verification code request information, an SMS message sent by the SMS number corresponding to the application identification information, where the SMS message may include an SMS verification code.

In an optional embodiment, before the trusted SMS application receives the verification code request information sent by the trusted service application, the trusted SMS application may receive the application identification information of the trusted service application and the SMS number that are sent by the trusted service application, establish a correspondence between the application identification information of the trusted service application and the SMS number, and store the application identification information of the trusted service application and the SMS number corresponding to the application identification information.

S204: The trusted SMS application sends the SMS verification code to the trusted service application.

After receiving the SMS message, the trusted SMS application may obtain the SMS verification code in the SMS message, and send the SMS verification code to the trusted service application.

In an optional embodiment, the trusted service application sends the SMS verification code to an application server corresponding to the trusted service application, the application server corresponding to the trusted service application verifies the SMS verification code, the application server corresponding to the trusted service application sends verification response information to the trusted service application, and the trusted service application performs a payment operation according to the verification response information. In this embodiment of the present invention, the client service application running in the second operating system cannot obtain information such as the SMS verification code. In this way, operation security can be improved.

S205: The trusted service application disrupts the session connection between the trusted service application and the client service application.

After receiving the SMS verification code, the trusted service application may disrupt the session connection between the trusted service application and the client service application. In a specific implementation, after the trusted service application executes the payment operation, the client service application may send a session disruption request to the trusted service application, and the trusted service application disrupts the session connection between the trusted service application and the client service application according to the session disruption request.

In an optional embodiment, when the first operating system is in a running state and the second operating system is in a suspended state, the trusted SMS application may determine whether a target SMS message sent by another SMS number other than the SMS number corresponding to the application identification information is received. When the target SMS message is received, the trusted SMS application may send the target SMS message to the client SMS application, so that the client SMS application receives and displays the target SMS message. The client SMS application is running in the second operating system.

S206: A client SMS application receives a target SMS message sent by another SMS number other than the SMS number corresponding to the application identification information.

After the trusted service application disrupts the session connection between the trusted service application and the client service application, the second operating system is switched to a running state, the first operating system is switched to a suspended state, and the client SMS application may receive a target SMS message sent by another SMS number other than the SMS number corresponding to the application identification information. Optionally, the client SMS application may further receive another SMS message sent by the SMS number corresponding to the application identification information.

In the information sending method shown in FIG. 2, a client service application establishes a session connection between the client service application and a trusted service application, the trusted service application sends verification code request information to a trusted SMS application. The verification code request information carries application identification information of the trusted service application or an SMS number corresponding to the application identification information, the trusted SMS application receives an SMS message sent by the SMS number corresponding to the application identification information, where the SMS message includes an SMS verification code, and the trusted SMS application sends the SMS verification code to the trusted service application. In this way, the trusted service application can complete a security operation when an SMS permission is disabled, and operation security is improved.

Figure 3:
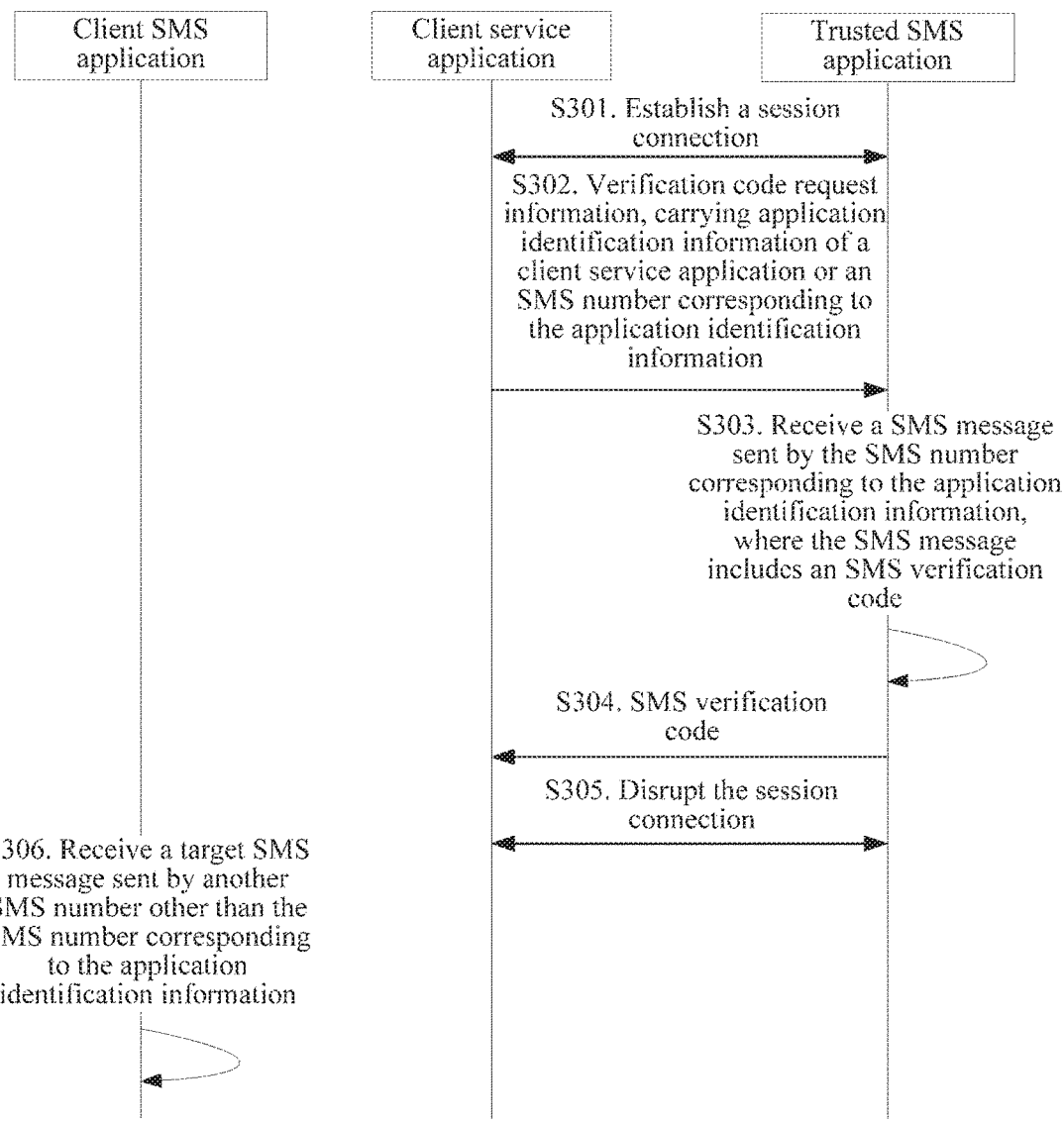
FIG. 3 is a schematic flowchart of an information sending method according to a third embodiment of the present invention.

Referring to FIG. 3, FIG. 3 is a schematic flowchart of an information sending method according to a third embodiment of the present invention. As shown in the figure, the information sending method in this embodiment of the present invention may include the following steps.

S301: A client service application establishes a session connection between the client service application and a trusted SMS application.

A client service application may send a session establishment request to a trusted SMS application, and the trusted SMS application establishes a session connection between the trusted SMS application and the client service application according to the session establishment request.

In a specific implementation, before the client service application establishes the session connection between the client service application and the trusted SMS application, a second operating system is in a running state, and a first operating system is in a suspended state. After the client service application establishes the session connection between the client service application and the trusted SMS application, the first operating system is switched to a running state, and the second operating system is switched to a suspended state.

In an optional embodiment, after the client service application establishes the session connection between the client service application and the trusted SMS application, the first operating system is switched to a running state, the second operating system is switched to a suspended state, and the trusted SMS application may determine whether a target SMS message sent by another SMS number other than an SMS number corresponding to application identification information of the client service application is received. If a result of the determining is yes, the trusted SMS application sends the target SMS message to a client SMS application, so that the client SMS application receives the target SMS message, and displays the received target SMS message on a display screen. Optionally, the trusted SMS application may determine whether another SMS message sent by the SMS number corresponding to the application identification information is received, where the another SMS message does not include an SMS verification code, and for example, may include advertisement information or transaction information. If a result of the determining is yes, the trusted SMS application sends the another SMS message to the client SMS application, so that the client SMS application receives the another SMS message, and displays the received another SMS message on the display screen.

S302: The client service application sends verification code request information to the trusted SMS application, where the verification code request information carries application identification information of the client service application or an SMS number corresponding to the application identification information.

S303: The trusted SMS application receives an SMS message sent by the SMS number corresponding to the application identification information, where the SMS message includes an SMS verification code.

The trusted SMS application may receive, according to the verification code request information, an SMS message sent by the SMS number corresponding to the application identification information, where the SMS message may include an SMS verification code.

In an optional embodiment, before the trusted SMS application receives the verification code request information sent by the client service application, the trusted SMS application may receive the application identification information of the client service application and the SMS number that are sent by the client service application, establish a correspondence between the application identification information of the client service application and the SMS number, and store the application identification information of the client service application and the SMS number corresponding to the application identification information.

S304: The trusted SMS application sends the SMS verification code to the client service application.

After receiving the SMS message, the trusted SMS application may obtain the SMS verification code in the SMS message, and send the SMS verification code to the client service application.

In an optional embodiment, the client service application sends the SMS verification code to an application server corresponding to the client service application, the application server corresponding to the client service application verifies the SMS verification code, the application server corresponding to the client service application sends verification response information to the client service application, and the client service application performs a login operation according to the verification response information. In this embodiment of the present invention, the client service application running in the second operating system does not have a permission of reading an SMS verification code, but may receive the SMS verification code sent by the trusted SMS application. A malicious application cannot obtain the SMS verification code by using a virus, a Trojan horse, a phishing website, or the like. In this way, operation security can be improved.

S305: The trusted SMS application disrupts the session connection between the trusted SMS application and the client service application.

After receiving the SMS verification code, the client service application may disrupt the session connection between the client service application and the trusted SMS application. In a specific implementation, after receiving the SMS verification code, the client service application may send a session disruption request to the trusted SMS application, so that the trusted SMS application disrupts the session connection between the trusted SMS application and the client service application according to the session disruption request.

In an optional embodiment, when the first operating system is in a running state and the second operating system is in a suspended state, the trusted SMS application may determine whether a target SMS message sent by another SMS number other than the SMS number corresponding to the application identification information is received. When the target SMS message is received, the trusted SMS application may send the target SMS message to the client SMS application, so that the client SMS application receives and displays the target SMS message.

S306: A client SMS application receives a target SMS message sent by another SMS number other than the SMS number corresponding to the application identification information.

After the trusted service application disrupts the session connection between the trusted service application and the client service application, the second operating system is switched to a running state, the first operating system is switched to a suspended state, and the client SMS application may receive a target SMS message sent by another SMS number other than the SMS number corresponding to the application identification information. Optionally, client SMS application may further receive another SMS message sent by the SMS number corresponding to the application identification information.

In the information sending method shown in FIG. 3, a client service application sends verification code request information to a trusted SMS application. The verification code request information carries application identification information of the client service application or an SMS number corresponding to the application identification information, the trusted SMS application receives an SMS message sent by the SMS number corresponding to the application identification information, where the SMS message includes an SMS verification code, and the trusted SMS application sends the SMS verification code to the client service application. In this way, the client service application can obtain the SMS verification code when an SMS permission is disabled, and operation security is improved.

Figure 4:
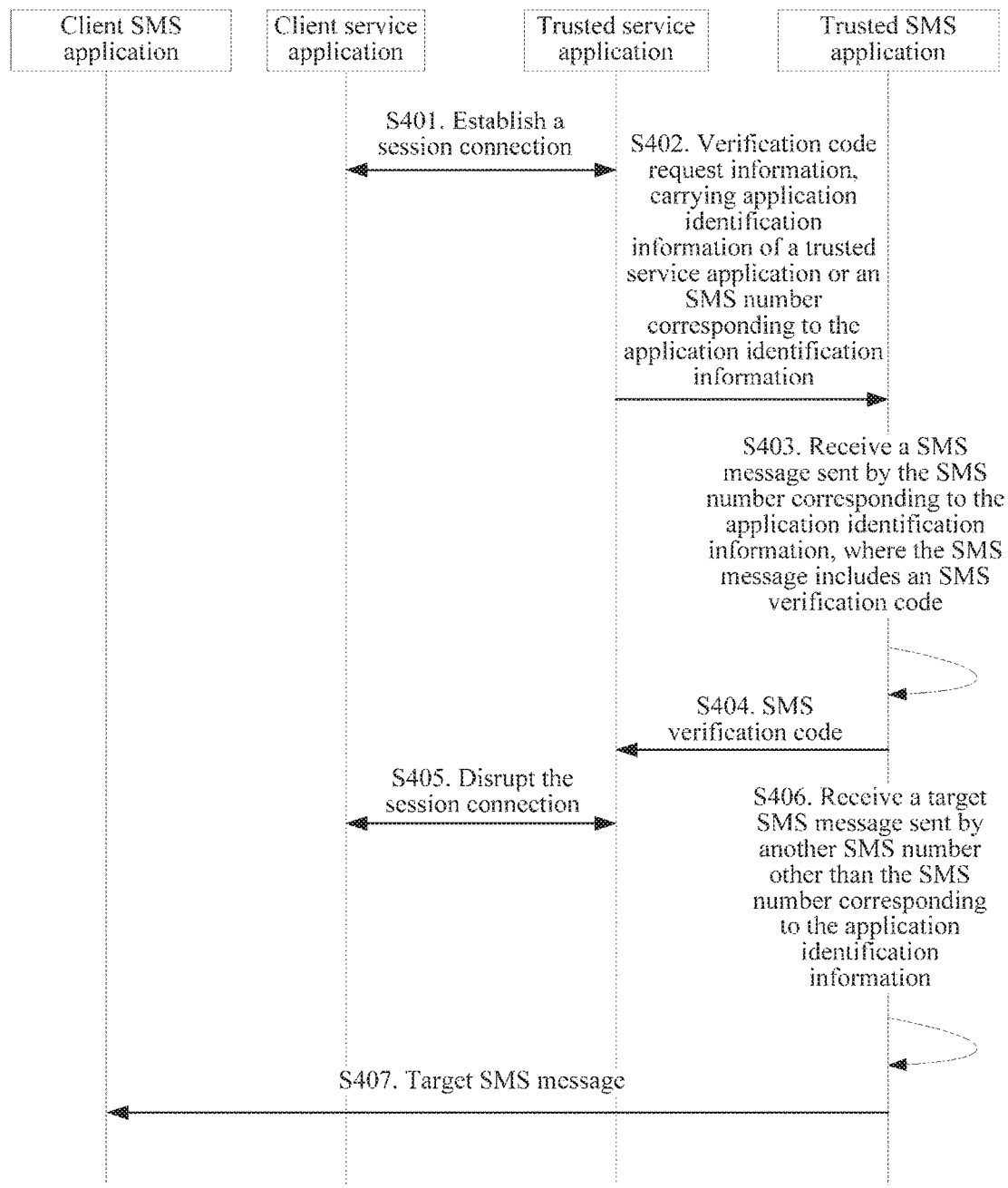
FIG. 4 is a schematic flowchart of an information sending method according to a fourth embodiment of the present invention.

Referring to FIG. 4, FIG. 4 is a schematic flowchart of an information sending method according to a fourth embodiment of the present invention. As shown in the figure, the information sending method in this embodiment of the present invention may include the following steps.

S401: A client service application establishes a session connection between the client service application and a trusted service application.

When performing a security operation, a client service application may send a session establishment request to a trusted service application, and the trusted service application establishes a session connection between the trusted service application and the client service application according to the session establishment request.

In a specific implementation, a first operating system and a second operating system keep in a running state. Before the client service application establishes the session connection between the client service application and the trusted service application, work modes of the first operating system and the second operating system are: The second operating system is running in the foreground, and the first operating system is running in the background. After the client service application establishes the session connection between the client service application and the trusted service application, the work modes of the first operating system and the second operating system are switched to: The first operating system is running in the foreground, and the second operating system is running in the background.

In an optional embodiment, the client service application may establish the session connection between the client service application and the trusted service application by using a TEE Client API. For example, the client service application may access, by using the TEE Client API, the trusted service application running in the first operating system.

S402: The client service application sends verification code request information to the trusted service application, where the verification code request information carries application identification information of the trusted service application or an SMS number corresponding to the application identification information.

S403: A trusted SMS application receives an SMS message sent by the SMS number corresponding to the application identification information, where the SMS message includes an SMS verification code.

The trusted SMS application may receive, according to the verification code request information, an SMS message sent by the SMS number corresponding to the application identification information, where the SMS message may include an SMS verification code.

In an optional embodiment, before the trusted SMS application receives the verification code request information sent by the trusted service application, the trusted SMS application may receive the application identification information of the trusted service application and the SMS number that are sent by the trusted service application, establish a correspondence between the application identification information of the trusted service application and the SMS number, and store the application identification information of the trusted service application and the SMS number corresponding to the application identification information.

S404: The trusted SMS application sends the SMS verification code to the trusted service application.

After receiving the SMS message, the trusted SMS application may obtain the SMS verification code in the SMS message, and send the SMS verification code to the trusted service application.

In an optional embodiment, the trusted service application may send the SMS verification code to an application server corresponding to the trusted service application, the application server corresponding to the trusted service application verifies the SMS verification code, the application server corresponding to the trusted service application sends verification response information to the trusted service application, and the trusted service application performs a payment operation according to the verification response information. In this embodiment of the present invention, the client service application running in the second operating system cannot obtain information such as the SMS verification code. In this way, operation security can be improved.

S405: The trusted service application disrupts the session connection between the trusted service application and the client service application.

After receiving the SMS verification code, the trusted service application may disrupt the session connection between the trusted service application and the client service application. In a specific implementation, after the trusted service application executes the payment operation according to the SMS verification code, the client service application may send a session disruption request to the trusted service application, and the trusted service application disrupts the session connection between the trusted service application and the client service application according to the session disruption request. The work modes of the first operating system and the second operating system may be switched to: The second operating system is running in the foreground, and the first operating system is running in the background.

S406: The trusted SMS application receives a target SMS message sent by another SMS number other than the SMS number corresponding to the application identification information.

After disrupting a session connection between the trusted SMS application and the client service application, the trusted SMS application may receive a target SMS message sent by another SMS number other than the SMS number corresponding to the application identification information. In a specific implementation, an order for performing step S406 is not limited in this embodiment of the present invention. For example, before the client service application establishes the session connection between the client service application and the trusted service application, the trusted SMS application may receive a target SMS message sent by another SMS number other than the SMS number corresponding to the application identification information. For another example, after the client service application establishes the session connection between the client service application and the trusted service application, the trusted SMS application may receive a target SMS message sent by another SMS number other than the SMS number corresponding to the application identification information.

In an optional embodiment, the trusted SMS application may further receive another SMS message sent by the SMS number corresponding to the application identification information, where the another SMS message does not include the SMS verification code, and for example, may include advertisement information or transaction information. The trusted SMS application may send the another SMS message to the client SMS application.

S407: The trusted SMS application sends the target SMS message to a client SMS application.

After receiving the target SMS message, the trusted SMS application may send the target SMS message to the client SMS application. In this embodiment of the present invention, the client SMS application does not have a permission of reading an SMS message, and may receive only the target SMS message sent by the trusted SMS application. A malicious application cannot obtain any SMS message by using a virus, a Trojan horse, or a phishing website. In this way, operation security is relatively high.

In the information sending method shown in FIG. 4, a client service application establishes a session connection between the client service application and a trusted service application, the trusted service application sends verification code request information to a trusted SMS application. The verification code request information carries application identification information of the trusted service application or an SMS number corresponding to the application identification information, the trusted SMS application receives an SMS message sent by the SMS number corresponding to the application identification information, where the SMS message includes an SMS verification code, and the trusted SMS application sends the SMS verification code to the trusted service application. In this way, the trusted service application can complete a security operation when an SMS permission is disabled, and operation security is improved.

Figure 5:
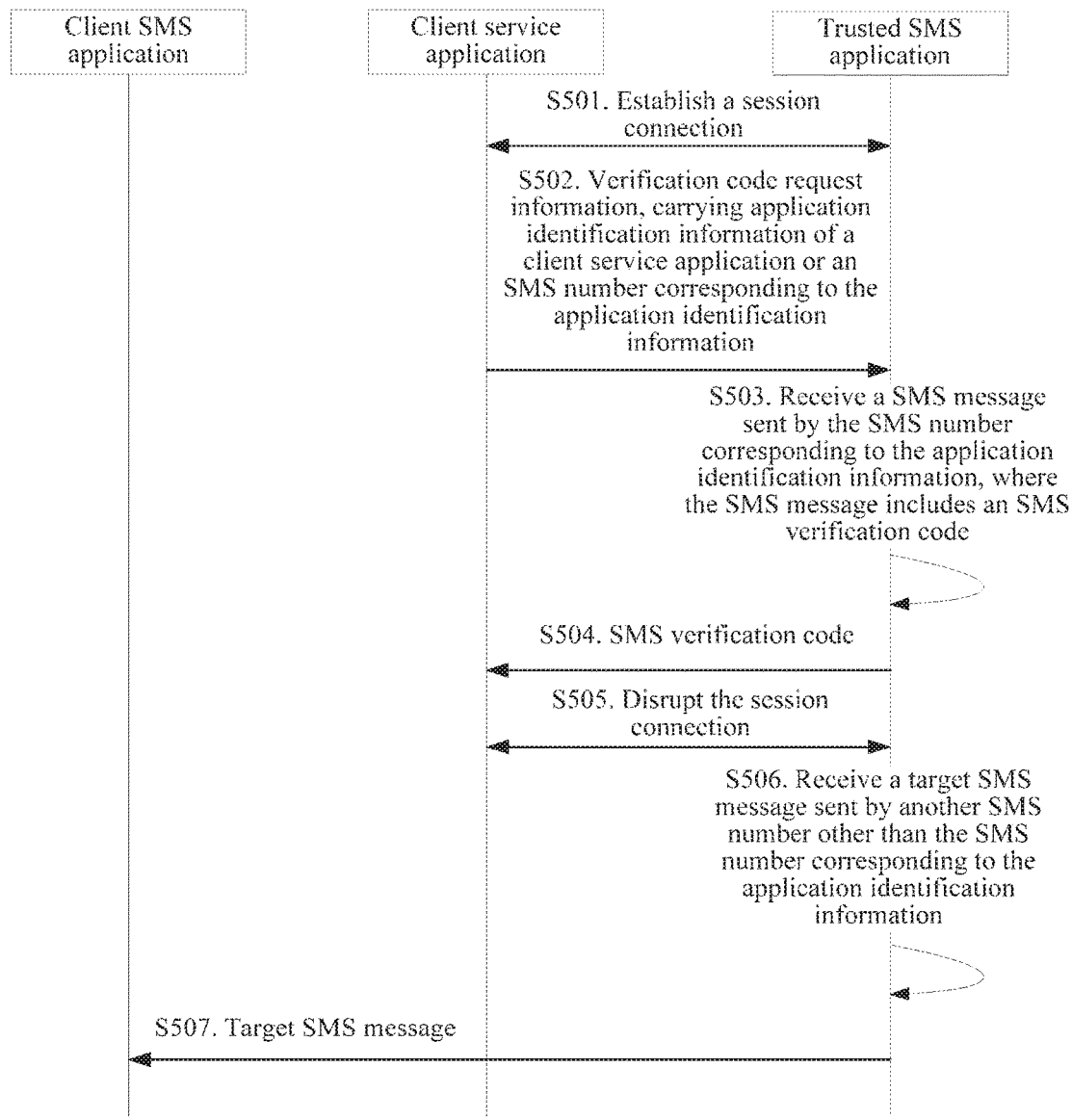
FIG. 5 is a schematic flowchart of an information sending method according to a fifth embodiment of the present invention.

Referring to FIG. 5, FIG. 5 is a schematic flowchart of an information sending method according to a fifth embodiment of the present invention. As shown in the figure, the information sending method in this embodiment of the present invention may include the following steps.

S501: A client service application establishes a session connection between the client service application and a trusted SMS application.

In a specific implementation, a client service application may send a session establishment request to a trusted SMS application, and the trusted SMS application establishes a session connection between the trusted SMS application and the client service application according to the session establishment request.

A first operating system and a second operating system keep in a running state. Before the client service application establishes the session connection between the client service application and the trusted SMS application, work modes of the first operating system and the second operating system are: The second operating system is running in the foreground, and the first operating system is running in the background. After the client service application establishes the session connection between the client service application and the trusted SMS application, the work modes of the first operating system and the second operating system are switched to: The first operating system is running in the foreground, and the second operating system is running in the background.

In an optional embodiment, the client service application may establish the session connection between the client service application and the trusted SMS application by using a TEE Client API. For example, the client service application may access, by using the TEE Client API, the trusted SMS application running in the first operating system.

S502: The client service application sends verification code request information to the trusted SMS application, where the verification code request information carries application identification information of the client service application or an SMS number corresponding to the application identification information.

S503: The trusted SMS application receives an SMS message sent by the SMS number corresponding to the application identification information, where the SMS message includes an SMS verification code.

In an optional embodiment, before the trusted SMS application receives the verification code request information sent by the client service application, the trusted SMS application may receive the application identification information of the client service application and the SMS number that are sent by the client service application, establish a correspondence between the application identification information of the client service application and the SMS number, and store the application identification information of the client service application and the SMS number corresponding to the application identification information.

S504: The trusted SMS application sends the SMS verification code to the client service application.

In an optional embodiment, the client service application may send the SMS verification code to an application server corresponding to the client service application, the application server corresponding to the client service application verifies the SMS verification code, the application server corresponding to the client service application sends verification response information to the client service application, and the client service application performs a login operation according to the verification response information. In this embodiment of the present invention, the client service application running in the second operating system does not have a permission of reading an SMS verification code, but may receive the SMS verification code sent by the trusted SMS application. A malicious application cannot obtain the SMS verification code by using a virus, a Trojan horse, a phishing website, or the like. In this way, operation security can be improved.

S505: The trusted SMS application disrupts the session connection between the trusted SMS application and the client service application.

In a specific implementation, after receiving the SMS verification code, the client service application may send a session disruption request to the trusted SMS application, and the trusted SMS application disrupts the session connection between the trusted SMS application and the client service application according to the session disruption request. The work modes of the first operating system and the second operating system may be switched to: The second operating system is running in the foreground, and the first operating system is running in the background.

S506: The trusted SMS application receives a target SMS message sent by another SMS number other than the SMS number corresponding to the application identification information.

After disrupting the session connection between the trusted SMS application and the client service application, the trusted SMS application may receive a target SMS message sent by another SMS number other than the SMS number corresponding to the application identification information. In a specific implementation, an order for performing step S506 is not limited in this embodiment of the present invention. For example, before establishing the session connection between the trusted SMS application and the client service application, the trusted SMS application may receive a target SMS message sent by another SMS number other than the SMS number corresponding to the application identification information. For another example, after establishing the session connection between the trusted SMS application and the client service application, the trusted SMS application may receive a target SMS message sent by another SMS number other than the SMS number corresponding to the application identification information.

In an optional embodiment, the trusted SMS application may further receive another SMS message sent by the SMS number corresponding to the application identification information, where the another SMS message does not include the SMS verification code, and for example, may include advertisement information or transaction information. The trusted SMS application may send the another SMS message to a client SMS application.

S507: The trusted SMS application sends the target SMS message to a client SMS application.

After receiving the target SMS message, the trusted SMS application may send the target SMS message to the client SMS application. In this embodiment of the present invention, the client SMS application does not have a permission of reading an SMS message, and may receive only the target SMS message sent by the trusted SMS application. A malicious application cannot obtain any SMS message by using a virus, a Trojan horse, or a phishing website. In this way, operation security is relatively high.

In the information sending method shown in FIG. 5, a client service application sends verification code request information to a trusted SMS application. The verification code request information carries application identification information of the client service application, the trusted SMS application receives an SMS message sent by an SMS number corresponding to the application identification information, where the SMS message includes an SMS verification code, and the trusted SMS application sends the SMS verification code to the client service application. In this way, the client service application can obtain the SMS verification code when an SMS permission is disabled, and operation security is improved.

Figure 6:
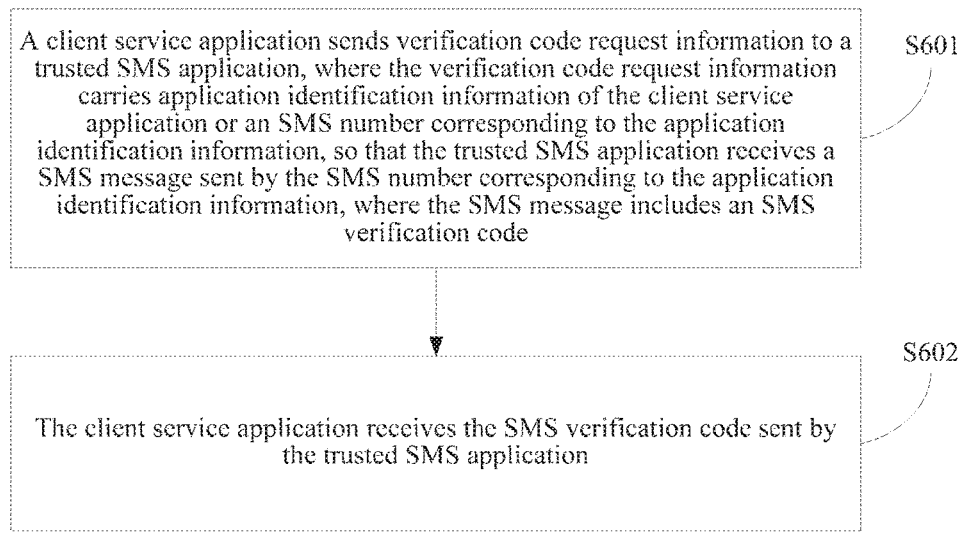
FIG. 6 is a schematic flowchart of an information receiving method according to a first embodiment of the present invention.

Referring to FIG. 6, FIG. 6 is a schematic flowchart of an information receiving method according to a first embodiment of the present invention. As shown in the figure, the information receiving method in this embodiment of the present invention may include the following steps.

S601: A client service application sends verification code request information to a trusted SMS application, where the verification code request information carries application identification information of the client service application or an SMS number corresponding to the application identification information, so that the trusted SMS application receives an SMS message sent by the SMS number corresponding to the application identification information, where the SMS message includes an SMS verification code.

When needing to obtain an SMS verification code, a client service application may send verification code request information to a trusted SMS application. The verification code request information carries application identification information of the client service application or an SMS number corresponding to the application identification information, so that the trusted SMS application receives an SMS message sent by the SMS number corresponding to the application identification information. The SMS message may include an SMS verification code.

In an optional embodiment, when performing a security operation, the client service application may send a session establishment request to a corresponding trusted service application, so that the trusted service application establishes a session connection between the trusted service application and the client service application according to the session establishment request. The trusted service application sends verification code request information to the trusted SMS application. The verification code request information may carry application identification information of the trusted service application or an SMS number corresponding to the application identification information, so that the trusted SMS application receives an SMS message sent by the SMS number corresponding to the application identification information, where the SMS message includes an SMS verification code.

In an optional embodiment, the client service application may establish a session connection between the client service application and a corresponding trusted service application. The trusted service application sends verification code request information to the trusted SMS application. The verification code request information may carry application identification information of the trusted service application or an SMS number corresponding to the application identification information. The trusted SMS application receives an SMS message sent by the SMS number corresponding to the application identification information, and the trusted SMS application sends an SMS verification code to the trusted service application. The trusted service application sends the SMS verification code to an application server corresponding to the trusted service application, the application server corresponding to the trusted service application verifies the SMS verification code, the application server corresponding to the trusted service application sends verification response information to the trusted service application, and the trusted service application performs a payment operation according to the verification response information.

In an optional embodiment, before sending the verification code request information to the trusted SMS application, the client service application may establish a session connection between the client service application and the trusted SMS application.

Further optionally, when the first operating system is a TEE environment, the client service application may establish the session connection between the client service application and the trusted SMS application by using a TEE Client API.

S602: The client service application receives the SMS verification code sent by the trusted SMS application.

The client service application may receive the SMS verification code sent by the trusted SMS application.

In an optional embodiment, after receiving the SMS verification code sent by the trusted SMS application, the client service application may disrupt the session connection between the client service application and the trusted SMS application.

In an optional embodiment, after receiving the SMS verification code sent by the trusted SMS application, the client service application may send the SMS verification code to an application server corresponding to the client service application, the application server corresponding to the client service application verifies the SMS verification code, the application server corresponding to the client service application sends verification response information to the client service application, and the client service application performs a login operation according to the verification response information.

In the information receiving method shown in FIG. 6, a client service application sends verification code request information to a trusted SMS application. The verification code request information carries application identification information of the client service application, so that the trusted SMS application receives an SMS message sent by an SMS number corresponding to the application identification information, where the SMS message includes an SMS verification code, and the client service application receives the SMS verification code sent by the trusted SMS application. In this way, the client service application can obtain the SMS verification code when an SMS permission is disabled, and operation security is improved.

An embodiment of the present invention further provides a computer storage medium, where the computer storage medium may store a program, and when executed, the program performs some or all steps in the method embodiments shown in FIG. 1 to FIG. 5 and FIG. 12.

An embodiment of the present invention further provides a computer storage medium, where the computer storage medium may store a program, and when executed, the program performs some or all steps in any one of the method embodiments shown in FIG. 2 to FIG. 6 and FIG. 13.

Figure 7:
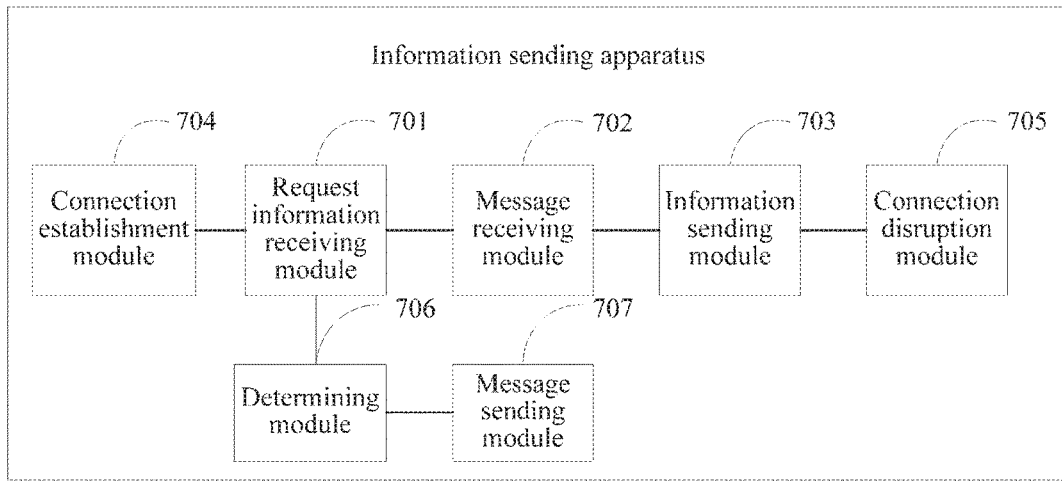
FIG. 7 is a schematic structural diagram of an information sending apparatus according to an embodiment of the present invention.

Referring to FIG. 7, FIG. 7 is a schematic structural diagram of an information sending apparatus according to an embodiment of the present invention. The information sending apparatus may be configured to implement some or all steps in the method embodiments described with reference to FIG. 1 to FIG. 5. The information sending apparatus may include at least a request information receiving module 701, a message receiving module 702, and an information sending module 703, where the request information receiving module 701 is configured to receive request information sent by a second application, where the request information carries association information of the second application, the information sending apparatus is running in a first operating system, the first operating system includes a first network interface, the second application is running in a second operating system, the second operating system may include a second network interface, and the first operating system has a higher security level than the second operating system; the message receiving module 702 is configured to receive a first message from an external network by using the first network interface; and the information sending module 703 is configured to extract first information from the first message according to the association information of the second application, and send the first information to the second application, so that the second application sends, by using the second network interface, the first information to an application server corresponding to the second application.

In an optional embodiment, the request information receiving module 701 is specifically configured to receive request information sent by a third application corresponding to the second application, where the request information carries association information of the third application.

Further optionally, the information sending module 703 sends the first information to the third application, and is specifically configured to send the first information to the third application, so that the third application sends, by using a third network interface, the first information to an application server corresponding to the third application. The first operating system may further include the third network interface.

Further optionally, the information sending module 703 sends the first information to the third application, and is specifically configured to send the first information to the third application, so that the third application sends, by using a third network interface, the first information to an application server corresponding to the third application, the application server corresponding to the third application verifies the first information and sends verification response information to the third application, and the third application performs a payment operation according to the verification response information.

In an optional embodiment, the information sending apparatus in this embodiment of the present invention may further include: a connection establishment module 704, configured to: before the request information receiving module 701 receives the verification code request information sent by the second application, establish a session connection between the apparatus and the second application; and a connection disruption module 705, configured to: after the information sending module 703 sends the first information to the second application, disrupt the session connection between the apparatus and the second application.

Further optionally, the first operating system may be a TEE; and the connection establishment module 704 is specifically configured to establish the session connection between the apparatus and the second application by using a TEE Client API.

Further optionally, the information sending module 703 sends the first information to the third application, and is specifically configured to send the first information to the second application, so that the second application sends, by using the second network interface, the first information to the application server corresponding to the second application, the application server corresponding to the second application verifies the first information and sends verification response information to the second application, and the second application performs a login operation according to the verification response information.

In an optional embodiment, the information sending apparatus in this embodiment of the present invention may further include: a determining module 706, configured to determine whether a second message from the external network is received by using the first network interface; and a message sending module 707, configured to: when the determining module 706 determines that the second message is received, send the second message to a fourth application, where the fourth application is running in the second operating system.

Further optionally, the determining module 706 is specifically configured to: after the request information receiving module 701 receives the request information sent by the second application, determine whether the second message is received by using the first network interface.

In an optional embodiment, the verification code request information may carry information about a preset time threshold; and the message receiving module 702 is specifically configured to receive, by using the first network interface, the first message that is sent from the external network within the preset time threshold.

In the information sending apparatus shown in FIG. 7, the request information receiving module 701 receives request information sent by a second application. The request information carries association information of the second application, the message receiving module 702 receives a first message from an external network by using a first network interface, and the information sending module 703 extracts first information from the first message according to the association information of the second application, and sends the first-information to the second application, so that the second application sends, by using a second network interface, the first information to an application server corresponding to the second application. In this way, the second application can obtain an SMS verification code when an SMS permission is disabled, and operation security is improved.

Figure 8:
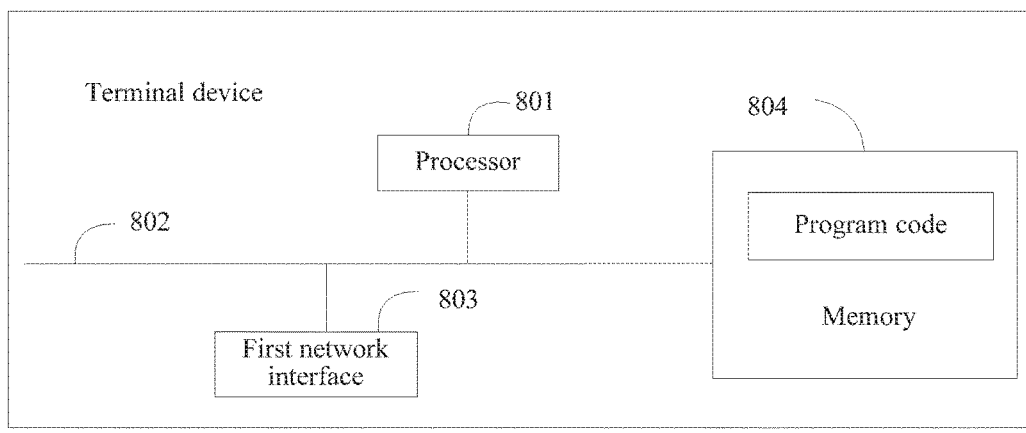
FIG. 8 is a schematic structural diagram of a terminal according to a first embodiment of the present invention.

Referring to FIG. 8, FIG. 8 is a schematic structural diagram of a terminal device according to a first embodiment of the present invention. The terminal device provided in this embodiment of the present invention may be configured to implement the methods implemented in the foregoing embodiments of the present invention shown in FIG. 1 to FIG. 5. For ease of description, only parts related to this embodiment of the present invention are illustrated. For specific technical details that are not disclosed, refer to the embodiments of the present invention shown in FIG. 1 to FIG. 5.

As shown in FIG. 8, the terminal device includes: at least one processor 801, for example, a CPU, at least one first network interface 803, a memory 804, and at least one communications bus 802. The communications bus 802 is configured to implement connection and communication between these components. The first network interface 803 may optionally include a standard wired interface or wireless interface (for example, a Wi-Fi interface), and is configured to communicate with an external network. The memory 804 may include a high-speed RAM memory, or may further include a non-volatile memory (non-volatile memory), for example, at least one magnetic disk storage. The memory 804 may optionally include at least one storage apparatus far away from the processor 801. The terminal may include a first operating system and a second operating system, the first operating system has a higher security level than the second operating system, the processor 801 is running in the first operating system, and the processor 801 may be combined with the information sending apparatus shown in FIG. 7. The memory 804 stores a set of program code, and the processor 801 is configured to invoke the program code stored in the memory 804 to execute the following operations: receiving request information sent by a second application, where the request information carries association information of the second application; receiving a first message from the external network by using the first network interface 803; and extracting first information from the first message according to the association information of the second application, and sending the first information to the second application, so that the second application sends, by using a second network interface, the first information to an application server corresponding to the second application.

In an optional embodiment, the receiving, by the processor 801, request information sent by a second application may be specifically: receiving request information sent by a third application corresponding to the second application, where the request information may carry association information of the third application; and the third application is running in the first operating system.

Further optionally, the sending, by the processor 801, the first information to the second application may be specifically: sending the first information to the third application, so that the third application sends, by using a third network interface, the first information to an application server corresponding to the third application, where the first operating system may further include the third network interface.

Further optionally, the sending, by the processor 801, the first information to the second application may be specifically: sending the first information to the third application, so that the third application sends, by using the third network interface, the first information to the application server corresponding to the third application, the application server corresponding to the third application verifies the first information and sends verification response information to the third application, and the third application performs a payment operation according to the verification response information.

In an optional embodiment, before receiving the request information sent by the second application, the processor 801 may further execute the following operation: establishing a session connection between the processor 801 and the second application; and after sending the first information to the second application, the processor 801 may further execute the following operation: disrupting the session connection between the processor 801 and the second application.

Further optionally, the first operating system may be a TEE environment; and the establishing, by the processor 801, a session connection between the processor 801 and the second application may be specifically: establishing the session connection between the processor 801 and the second application by using a TEE Client API.

Further optionally, the sending, by the processor 801, the first information to the second application may be specifically: sending the first information to the second application, so that the second application sends, by using the second network interface, the first information to the application server corresponding to the second application, the application server corresponding to the second application verifies the first information and sends verification response information to the second application, and the second application performs a login operation according to the verification response information.

In an optional embodiment, the processor 801 may further execute the following operations: determining whether a second message from the external network is received by using the first network interface 803; and when the second message is received, sending the second message to a fourth application, where the fourth application is running in the second operating system.

Further optionally, the determining, by the processor 801, whether a second message from the external network is received by using the first network interface 803 may be specifically: after the request information sent by the second application is received, determining whether the second message is received by using the first network interface 803.

In an optional embodiment, the request information may carry information about a preset time threshold; and the receiving, by the processor 801, a first message from an external network by using the first network interface 803 may be specifically: receiving, by using the first network interface 803, a first message that is sent from the external network within the preset time threshold.

Specifically, the terminal described in this embodiment of the present invention may be configured to implement some or all processes in the method embodiments described in the present invention with reference to FIG. 1 to FIG. 5.

Figure 9:
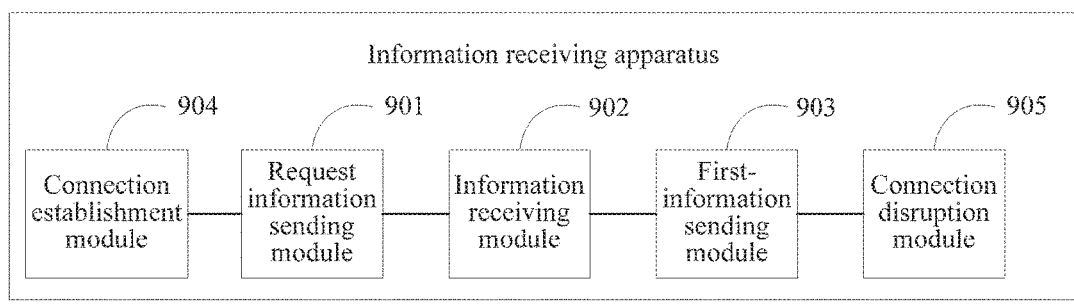
FIG. 9 is a schematic structural diagram of an information receiving apparatus according to an embodiment of the present invention.

Referring to FIG. 9, FIG. 9 is a schematic structural diagram of an information receiving apparatus according to an embodiment of the present invention. The information receiving apparatus may be configured to implement some or all steps in the method embodiments described with reference to FIG. 2 to FIG. 6. The information receiving apparatus may include at least a request information sending module 901, an information receiving module 902, and a first-information sending module 903, where the request information sending module 901 is configured to send request information to a first application, where the request information carries association information of the information receiving apparatus, so that the first application receives a first message from an external network by using a first network interface, and the first application extracts first information from the first message according to the association information of the information receiving apparatus, and sends the first information to the information receiving module 902, where the first application is running in a first operating system, the first operating system includes the first network interface, the information receiving apparatus is running in a second operating system, and the second operating system includes a second network interface; the message receiving module 902 is configured to receive the first information sent by the first application; and the first-information sending module 903 is configured to send, by using the second network interface, the first information to an application server corresponding to the information receiving apparatus.

In an optional embodiment, the request information sending module 901 is specifically configured to establish a session connection between the apparatus and a corresponding third application, so that the third application sends request information to the first application. The request information carries association information of the third application.

In an optional embodiment, the request information sending module 901 is specifically configured to establish a session connection between the apparatus and a corresponding third application, so that the third application sends request information to the first application. The request information carries association information of the third application, the first application extracts the first information from the first message according to the association information of the third application, and sends the first information to the third application, and the third application sends, by using a third network interface, the first information to an application server corresponding to the third application. The first operating system further includes the third network interface.

In an optional embodiment, the request information sending module 901 is specifically configured to establish a session connection between the apparatus and a corresponding third application, so that the third application sends request information to the first application. The request information carries association information of the third application, the first application extracts the first information from the first message according to the association information of the third application, and sends the first information to the third application, the third application sends, by using a third network interface, the first information to an application server corresponding to the third application, the application server corresponding to the third application verifies the first information and sends verification response information to the third application, and the third application performs a payment operation according to the verification response information.

In an optional embodiment, the information receiving apparatus in this embodiment of the present invention may further include: a connection establishment module 904, configured to: before the request information sending module 901 sends the request information to the first application, establish a session connection between the apparatus and the first application; and a connection disruption module 905, configured to: after the information receiving module 902 receives the first information sent by the first application, disrupt the session connection between the apparatus and the first application.

Further optionally, the first operating system may be a TEE environment; and the connection establishment module 904 is specifically configured to establish the session connection between the apparatus and the first application by using a TEE Client API.

Further optionally, the first-information sending module 903 is specifically configured to send, by using the second network interface, the first information to the application server corresponding to the information receiving apparatus, so that the application server corresponding to the information receiving apparatus verifies the first information, the application server corresponding to the information receiving apparatus sends verification response information to the first-information sending module 903, and the first-information sending module 903 performs a login operation according to the verification response information.

In the information receiving apparatus shown in FIG. 9, the request information sending module 901 sends request information to a first application. The request information carries association information of the information receiving apparatus, so that the first application receives a first message from an external network by using a first network interface, and the first application extracts first information from the first message according to the association information of the information receiving apparatus, and sends the first information to the information receiving module 902, and the first-information sending module 903 sends, by using a second network interface, the first information to an application server corresponding to the information receiving apparatus. In this way, the information receiving apparatus can obtain the first information when an information permission is disabled, and operation security is improved.

Figure 10:
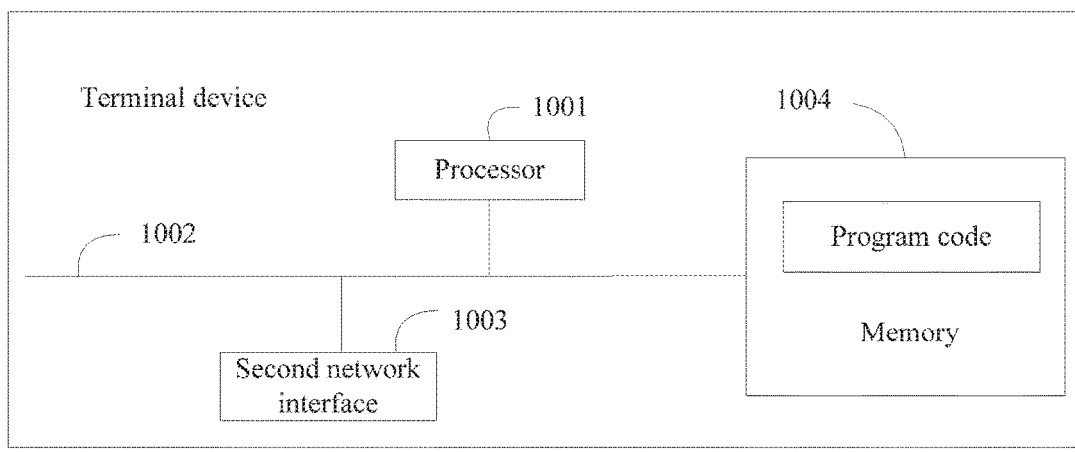
FIG. 10 is a schematic structural diagram of a terminal according to a second embodiment of the present invention.

Referring to FIG. 10, FIG. 10 is a schematic structural diagram of a terminal device according to a second embodiment of the present invention. The terminal device provided in this embodiment of the present invention may be configured to implement the methods implemented in the foregoing embodiments of the present invention shown in FIG. 2 to FIG. 6. For ease of description, only parts related to this embodiment of the present invention are illustrated. For specific technical details that are not disclosed, refer to the embodiments of the present invention shown in FIG. 2 to FIG. 6.

As shown in FIG. 10, the terminal device includes: at least one processor 1001, for example, a central processing unit (CPU), at least one second network interface 1003, a memory 1004, and at least one communications bus 1002. The communications bus 1002 is configured to implement connection and communication between these components. The second network interface 1003 may be configured to communicate with an application server corresponding to the processor. The memory 1004 may include a high-speed random access memory (RAM) memory, or may further include a non-volatile memory, for example, at least one magnetic disk storage. The memory 1004 may optionally include at least one storage apparatus far away from the processor 1001. The terminal may include a first operating system and a second operating system, the first operating system has a higher security level than the second operating system, the processor 1001 is running in the second operating system, and the processor 1001 may be combined with the information receiving apparatus shown in FIG. 9. The memory 1004 stores a set of program code, and the processor 1001 is configured to invoke the program code stored in the memory 1004 to execute the following operations: sending request information to a first application, where the request information carries association information of the processor 1001, so that the first application receives a first message from an external network by using a first network interface, and the first application extracts first information from the first message according to the association information of the processor 1001, and sends the first information to the processor 1001; receiving the first information sent by the first application; and sending, by using the second network interface 1003, the first information to an application server corresponding to the processor 1001.

In an optional embodiment, the sending, by the processor 1001, request information to the first application may be specifically: establishing a session connection between the processor 1001 and a corresponding third application, so that the third application sends request information to the first application, where the request information carries association information of the third application; and the third application is running in the first operating system.

In an optional embodiment, the sending, by the processor 1001, request information to the first application may be specifically: establishing a session connection between the processor 1001 and a corresponding third application, so that the third application sends request information to the first application, where the request information carries association information of the third application, the first application extracts the first information from the first message according to the association information of the third application, and sends the first information to the third application, and the third application sends, by using a third network interface, the first information to an application server corresponding to the third application, where the first operating system further includes the third network interface.

In an optional embodiment, the sending, by the processor 1001, request information to the first application may be specifically: establishing a session connection between the processor 1001 and a corresponding third application, so that the third application sends request information to the first application, where the request information carries association information of the third application, the first application extracts the first information from the first message according to the association information of the third application, and sends the first information to the third application, the third application sends, by using a third network interface, the first information to an application server corresponding to the third application, the application server corresponding to the third application verifies the first information and sends verification response information to the third application, and the third application performs a payment operation according to the verification response information.

In an optional embodiment, before sending the request information to the first application, the processor 1001 may further execute the following operation: establishing a session connection between the processor 1001 and the first application; and after receiving the first information sent by the first application, the processor 1001 may further execute the following operation: disrupting the session connection between the processor 1001 and the first application.

Further optionally, the first operating system may be a TEE environment; and the establishing, by the processor 1001, a session connection between the processor 1001 and the first application may be specifically: establishing the session connection between the processor 1001 and the first application by using a TEE Client API.

Further optionally, the sending, by the processor 1001 by using the second network interface 1003, the first information to an application server corresponding to the processor 1001 may be specifically: sending, by using the second network interface 1003, the first information to the application server corresponding to the processor 1001, so that the application server corresponding to the processor 1001 verifies the first information, the application server corresponding to the processor 1001 sends verification response information to the processor 1001, and the processor 1001 performs a login operation according to the verification response information.

Specifically, the terminal described in this embodiment of the present invention may be configured to implement some or all processes in the method embodiments described in the present invention with reference to FIG. 2 to FIG. 6.

Figure 11:
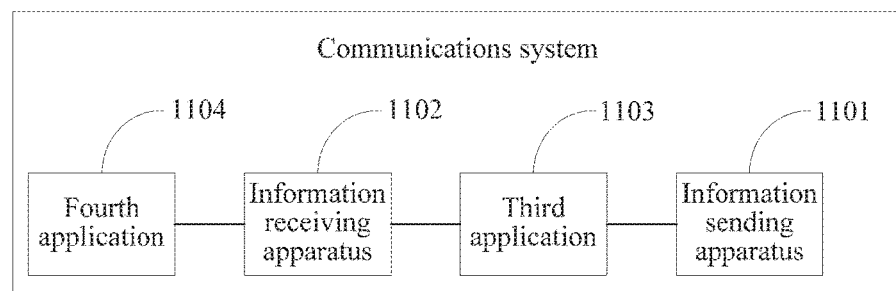
FIG. 11 is a schematic structural diagram of a communications system according to an embodiment of the present invention.

Referring to FIG. 11, FIG. 11 is a schematic structural diagram of a communications system according to an embodiment of the present invention. As shown in the figure, the communications system in this embodiment of the present invention may include at least an information sending apparatus 1101 and an information receiving apparatus 1102, where the information receiving apparatus 1102 is configured to send request information to the information sending apparatus 1101, where the request information carries association information of the information receiving apparatus 1102, the information sending apparatus 1101 is running in a first operating system, the information receiving apparatus 1102 is running in a second operating system, and the first operating system has a higher security level than the second operating system; the information sending apparatus 1101 is configured to receive a first message from an external network by using a first network interface; and the information sending apparatus 1101 is further configured to extract first information from the first message according to the association information of the information receiving apparatus 1102, and send the first information to the information receiving apparatus 1102; and the information receiving apparatus 1102 is further configured to receive the first information sent by the information sending apparatus 1101, and send, by using a second network interface, the first information to an application server corresponding to the information receiving apparatus 1102.

In an optional embodiment, the communications system in this embodiment of the present invention may include a third application 1103, and the sending, by the information receiving apparatus 1102, request information to the information sending apparatus 1101 may be specifically: establishing, by the information receiving apparatus 1102, a session connection between the information receiving apparatus 1102 and the corresponding third application 1103; and sending, by the third application 1103, request information to the information sending apparatus 1101, where the request information carries association information of the third application 1103.

Further optionally, the receiving, by the information receiving apparatus 1102, the first information sent by the information sending apparatus 1101 may be specifically: receiving, by the third application 1103, the first information sent by the information sending apparatus 1101.

Further optionally, after receiving the first information sent by the information sending apparatus 1101, the third application 1103 may further execute the following operation: sending, by the third application 1103 by using a third network interface, the first information to an application server corresponding to the third application, where the first operating system further includes the third network interface.

Further optionally, after receiving the first information sent by the information sending apparatus 1101, the third application 1103 may further execute the following operation: sending, by the third application 1103 by using a third network interface, the first information to an application server corresponding to the third application 1103, so that the application server corresponding to the third application 1103 verifies the first information and 1103 sends verification response information to the third application 1103, and the third application 1103 performs a payment operation according to the verification response information.

In an optional embodiment, after the information receiving apparatus 1102 sends the request information to the information sending apparatus 1101, the following operation may be further executed: establishing, by the information sending apparatus 1101, a session connection between the information sending apparatus 1101 and the information receiving apparatus 1102; and after the information receiving apparatus 1102 receives the first information sent by the information sending apparatus 1101, the following operation may be further executed: disrupting, by the information sending apparatus 1101, the session connection between the information sending apparatus 1101 and the information receiving apparatus 1102.

Further optionally, the first operating system may be a TEE environment; and the establishing, by the information sending apparatus 1101, a session connection between the information sending apparatus 1101 and the information receiving apparatus 1102 may be specifically: establishing, by the information sending apparatus 1101, the session connection between the information sending apparatus 1101 and the information receiving apparatus 1102 by using a TEE Client API.

Further optionally, after receiving the first information sent by the information sending apparatus 1101, the information receiving apparatus 1102 may further execute the following operation: sending, by the information receiving apparatus 1102 by using the second network interface, the first information to the application server corresponding to the information receiving apparatus 1102, so that the application server corresponding to the information receiving apparatus 1102 verifies the first information, the application server corresponding to the information receiving apparatus 1102 sends verification response information to the information receiving apparatus 1102, and the information receiving apparatus 1102 performs a login operation according to the verification response information.

In an optional embodiment, the communications system in this embodiment of the present invention may further include a fourth application 1104, and the information sending apparatus 1101 may further execute the following operations: determining whether a second message from the external network is received by using the first network interface; and when the second message is received, sending, by the information sending apparatus 1101, the second message to the fourth application 1104, where the fourth application 1104 is running in the second operating system.

Further optionally, the determining, by the information sending apparatus 1101, whether a second message from the external network is received by using the first network interface may be specifically: after the information receiving apparatus 1102 sends the request information to the information sending apparatus 1101, determining, by the information sending apparatus 1101, whether the second message from the external network is received by using the first network interface.

In an optional embodiment, the request information may carry information about a preset time threshold; and the receiving, by the information sending apparatus 1101, a first message from an external network by using the first network interface may be specifically: receiving, by the information sending apparatus 1101 by using the first network interface, a first message that is sent from the external network within the preset time threshold.

In the communications system shown in FIG. 11, the information receiving apparatus 1102 sends request information to the information sending apparatus 1101, where the request information carries association information of the information receiving apparatus 1102, the information sending apparatus 1101 receives a first message from an external network by using a first network interface, extracts first information from the first message according to the association information of the information receiving apparatus 1102, and sends the first information to the information receiving apparatus 1102, and the information receiving apparatus 1102 sends, by using a second network interface, the first information to an application server corresponding to the information receiving apparatus 1102. In this way, the information receiving apparatus 1102 can obtain the first information when an information permission is disabled, and operation security is improved.

Figure 12:
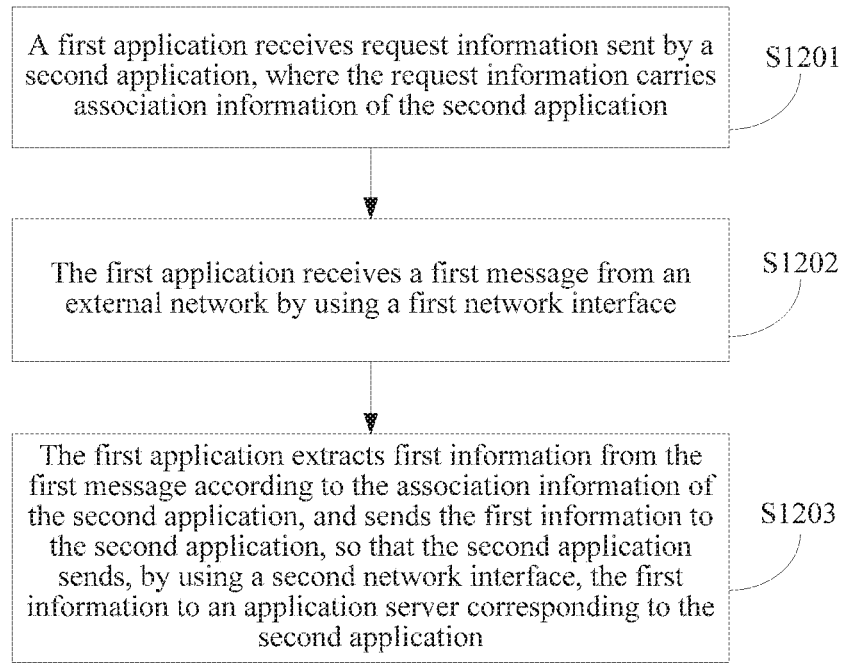
FIG. 12 is a schematic flowchart of an information sending method according to a sixth embodiment of the present invention.

Referring to FIG. 12, FIG. 12 is a schematic flowchart of an information sending method according to a sixth embodiment of the present invention. As shown in the figure, the information sending method in this embodiment of the present invention may include the following steps.

S1201: A first application receives request information sent by a second application, where the request information carries association information of the second application.

A first application may receive request information sent by a second application, where the request information may carry association information of the second application. The association information may include application identification information of the second application or contact information corresponding to the application identification information. The application identification information may be a universally unique identifier (UUID). The contact information may include an SMS number, an e-mail address, a public account, or the like, where a contact corresponding to the contact information is a sender that sends a first message. The first application is running in a first operating system, the first operating system may include a first network interface, the second application is running in a second operating system, and the second operating system may include a second network interface. The first operating system has a higher security level than the second operating system. For example, the first operating system may be a TEE environment, and the second operating system may be a Rich environment. An application running in the Rich environment is CA, for example, the second application. An application running in the TEE environment is TA, for example, the first application.

In an optional embodiment, the first application may receive request information sent by a third application corresponding to the second application. The request information may carry association information of the third application. The association information of the third application may include application identification information of the third application or contact information corresponding to the application identification information. The application identification information may be a UUID. The contact information may include an SMS number, an e-mail address, a public account, or the like, where a contact corresponding to the contact information is a sender that sends a first message. In a specific implementation, when the second application performs payment and other security operations, a terminal starts the third application running in the first operating system, and the third application sends request information to the first application.

For example, the second application running in the second operating system corresponds to a third application running in the first operating system. When the second application performs a security operation, the second application may send a session establishment request to the third application, and the third application establishes a session connection between the third application and the second application according to the session establishment request. The third application sends request information to the first application. The request information carries association information of the third application. The first application may receive the request information.

Further optionally, before the first application receives the request information sent by the third application, the first application may receive the application identification information of the third application and the contact information that are sent by the third application, establish a correspondence between the application identification information of the third application and the contact information, and store the application identification information of the third application and the contact information corresponding to the application identification information.

In an optional embodiment, before receiving the request information sent by the second application, the first application may establish a session connection between the first application and the second application.

Further optionally, when the first operating system is the TEE environment, the first application may establish the session connection between the first application and the second application by using a trusted operating system client application programming interface TEE Client API. In a specific implementation, the first application may receive a session establishment request sent by the second application, and establish the session connection between the first application and the second application according to the received session establishment request.

Further optionally, before the first application receives the request information sent by the second application, the first application may receive the application identification information of the second application and the contact information that are sent by the second application, establish a correspondence between the application identification information of the second application and the contact information, and store the application identification information of the second application and the contact information corresponding to the application identification information.

In an optional embodiment, the first application may determine whether a second message from an external network is received by using the first network interface. When the second message is received, the first application may send the second message to a fourth application, so that the fourth application receives and displays the second message. Further optionally, the first application may determine whether other information in a first message from the external network is received by using the first network interface, where the other information is not first information, and for example, may include advertisement information or transaction information. When the other information in the first message is received, the first application may send the other information to the fourth application, so that the fourth application receives and displays the other information.

For example, before receiving the request information sent by the second application, the first application may determine whether a second message from the external network is received by using the first network interface. When the second message is received, the first application may send the second message to the fourth application. For another example, after receiving the request information sent by the second application, before sending the first information to the second application, the first application may determine whether a second message from the external network is received by using the first network interface. When the second message is received, the first application may send the second message to the fourth application. For another example, after sending the first information to the second application, the first application may determine whether a second message from the external network is received by using the first network interface. When the second message is received, the first application may send the second message to the fourth application. In this embodiment of the present invention, the fourth application does not have a permission of reading information, and may receive only information forwarded by the first application. In this way, operation security is relatively high.

In a specific implementation, the first operating system and the second operating system keep in a running state. Before the second application establishes a session connection between the second application and the first application, work modes of the first operating system and the second operating system are: The second operating system is running in the foreground, and the first operating system is running in the background. After the second application establishes the session connection between the second application and the first application, the work modes of the first operating system and the second operating system are switched to: The first operating system is running in the foreground, and the second operating system is running in the background. After the second application disrupts the session connection between the second application and the first application, the work modes of the first operating system and the second operating system are switched to: The second operating system is running in the foreground, and the first operating system is running in the background.

In an optional embodiment, after receiving the request information sent by the second application, the first application may further determine whether a second message from the external network is received by using the first network interface. When the second message is received, the first application may send the second message to the fourth application, so that the fourth application receives and displays the second message. The fourth application is running in the second operating system.

Further optionally, before the first application receives the request information sent by the second application, or after the first application sends the first information to the second application, the fourth application may directly receive the second message from the external network, and display the received second message on a display screen. In this embodiment of the present invention, the fourth application does not have a permission of reading the first information, but has a permission of reading other information. In this way, information leakage is avoided, and operation security is relatively high.

In a specific implementation, when the first operating system is in a suspended state and the second operating system is in a running state, the fourth application may directly receive the second message from the external network. Optionally, the fourth application may further receive other information in the first message, where the other information does not include the first information, and for example, may include advertisement information or transaction information. When the second application performs a security operation, the second application sends a session establishment request to the first application. The first application establishes a session connection between the first application and the second application according to the session establishment request. In this case, the first operating system is switched to a running state, and the second operating system is switched to a suspended state. After the first application sends the first information to the second application, and the second application receives the first information, the second application sends a session disruption request to the first application. The first application disrupts the session connection between the first application and the second application according to the session disruption request. In this case, the first operating system is switched to a suspended state, and the second operating system is switched to a running state.

S1202: The first application receives a first message from an external network by using a first network interface.

The first application may receive a first message from an external network by using the first network interface. The first message may include an SMS message, a discount coupon, a broadcast message, or the like. For example, the first application may receive, by using the first network interface, a first message sent by the contact corresponding to the application identification information of the second application.

In an optional embodiment, the request information may further carry information about a preset time threshold, and the first application may receive a first message that is sent from the external network within the preset time threshold. In a specific implementation, the first application may start time counting when the request information is received, to determine whether a first message sent from the external network is received within the preset time threshold. When the first message sent from the external network is received within the preset time threshold, the first application obtains the first message. When the first message sent from the external network is not received within the preset time threshold, the first application may receive request information re-sent by the second application, and start time counting when the re-sent request information is received, to determine whether a first message sent from the external network is received within the preset time threshold. When the first message sent from the external network is received within the preset time threshold, the first application obtains the first message.

S1203: The first application extracts first information from the first message according to the association information of the second application, and sends the first information to the second application, so that the second application sends, by using a second network interface, the first information to an application server corresponding to the second application.

After receiving the first message, the first application may extract first information from the first message according to the association information of the second application, and send the first information to the second application, so that the second application sends, by using the second network interface, the first information to an application server corresponding to the second application. The first information may include sensitive information such as an SMS verification code, a discount coupon sequence number, or a digital signature.

In an optional embodiment, the first application may send the first information to the third application, so that the third application receives the first information, and the third application disrupts the session connection between the third application and the second application.

In an optional embodiment, the first application sends the first information to the third application, so that the third application sends, by using a third network interface, the first information to an application server corresponding to the third application. The first operating system may further include the third network interface.

In an optional embodiment, the first application sends the first information to the third application, so that the third application sends, by using a third network interface, the first information to an application server corresponding to the third application, the application server corresponding to the third application verifies the first information and sends verification response information to the third application, and the third application performs a payment operation according to the verification response information. After the third application executes the payment operation, the second application may send a session disruption request to the third application, and the third application disrupts the session connection between the third application and the second application according to the session disruption request. In this embodiment of the present invention, the payment operation is executed in the TEE environment, and a malicious application cannot obtain security information, for example, an SMS verification code, an account (for example, a bank card number or an Alipay™ account), or an account password, by using a virus, a Trojan horse, a phishing website, or the like. In this way, operation security can be improved.

In an optional embodiment, after sending the first information to the second application, the first application may disrupt the session connection between the first application and the second application. In a specific implementation, after receiving the first information, the second application may send a session disruption request to the first application, and the first application may disrupt the session connection between the first application and the second application according to the session disruption request.

In an optional embodiment, the first application sends the first information to the second application, so that the second application sends, by using the second network interface, the first information to an application server corresponding to the second application, the application server corresponding to the second application verifies the first information and sends verification response information to the second application, and the second application performs a login operation according to the verification response information.

In the information sending method shown in FIG. 12, a first application receives request information sent by a second application. The request information carries association information of the second application; the first application receives a first message from an external network by using a first network interface; and the first application extracts first information from the first message according to the association information of the second application, and sends the first information to the second application, so that the second application sends, by using a second network interface, the first information to an application server corresponding to the second application. In this way, the second application can obtain the first information when an information permission is disabled.

Figure 13:
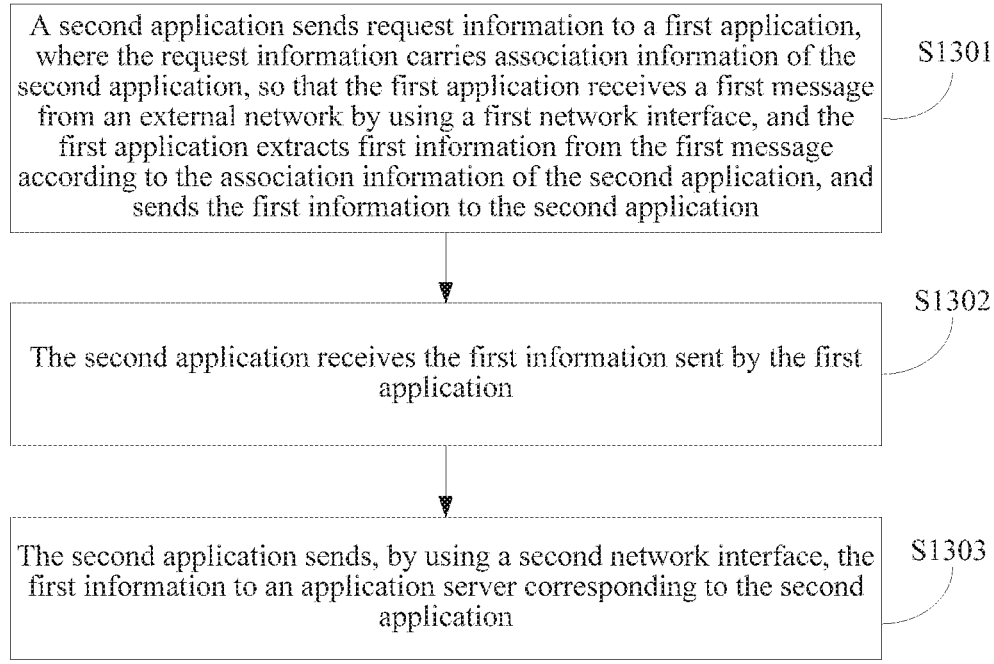
FIG. 13 is a schematic flowchart of an information receiving method according to a second embodiment of the present invention.

Referring to FIG. 13, FIG. 13 is a schematic flowchart of an information receiving method according to a second embodiment of the present invention. As shown in the figure, the information receiving method in this embodiment of the present invention may include the following steps.

S1301: A second application sends request information to a first application, where the request information carries association information of the second application, so that the first application receives a first message from an external network by using a first network interface, and the first application extracts first information from the first message according to the association information of the second application, and sends the first information to the second application.

When needing to obtain first information, a second application may send request information to a first application. The request information may carry association information of the second application, so that the first application receives a first message from an external network by using a first network interface, and the first application extracts the first information from the first message according to the association information of the second application, and sends the first information to the second application.

In an optional embodiment, when performing a security operation, the second application may send a session establishment request to a corresponding third application, so that the third application establishes a session connection between the third application and the second application according to the session establishment request. The third application sends request information to the first application. The request information may carry association information of the third application, so that the first application receives the first message from the external network by using the first network interface, and the first application extracts the first information from the first message according to the association information of the third application, and sends the first information to the third application.

In an optional embodiment, the second application may establish a session connection between the second application and a corresponding third application. The third application sends request information to the first application. The request information may carry association information of the third application. The first application receives the first message from the external network by using the first network interface, and the first application extracts the first information from the first message according to the association information of the third application, and sends the first information to the third application. The third application sends the first information to an application server corresponding to the third application by using a third network interface, where a first operating system may further include the third network interface.

In an optional embodiment, the second application may establish a session connection between the second application and a corresponding third application, so that the third application sends request information to the first application. The request information carries association information of the third application. The first application may extract the first information from the first message according to the association information of the third application, and send the first information to the third application. The third application sends, by using a third network interface, the first information to an application server corresponding to the third application, the application server corresponding to the third application verifies the first information and sends verification response information to the third application, and the third application performs a payment operation according to the verification response information.

In an optional embodiment, before sending the request information to the first application, the second application may establish a session connection between the second application and the first application.

Further optionally, when the first operating system is a TEE environment, the second application may establish the session connection between the second application and the first application by using a TEE Client API.

S1302: The second application receives the first information sent by the first application.

The second application may receive the first information sent by the first application.

In an optional embodiment, after receiving the request information sent by the first application, the second application may disrupt the session connection between the second application and the first application.

S1303: The second application sends, by using a second network interface, the first information to an application server corresponding to the second application.

In an optional embodiment, the second application sends, by using a second network interface, the first information to an application server corresponding to the second application, so that the application server corresponding to the second application verifies the first information and sends verification response information to the second application, and the second application performs a login operation according to the verification response information.

In the information receiving method shown in FIG. 13, a second application sends request information to a first application. The request information carries association information of the second application, so that the first application receives a first message from an external network by using a first network interface, and the first application extracts first information from the first message according to the association information of the second application, and sends the first information to the second application, and the second application sends, by using a second network interface, the first information to an application server corresponding to the second application. In this way, the second application can obtain the first information when an information permission is disabled.

In the descriptions of this specification, a description of a reference term such as "an embodiment," "some embodiments," "an example," "a specific example," or "some examples" means that a specific feature, structure, material, or characteristic that is described with reference to the embodiment or the example is included in at least one embodiment or example of the present invention. In the specification, the foregoing exemplary expressions of the terms are not necessarily with respect to a same embodiment or example. In addition, the described specific features, structures, materials, or characteristics may be combined in a proper manner in any one or more of the embodiments or examples. In addition, a person skilled in the art may integrate or combine different embodiments or examples and characteristics of different embodiments or examples described in the specification, as long as they do not conflict each other.

In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include at least one of the features. In the descriptions of the present invention, "multiple" means at least two, for example, two or three, unless exactly specified otherwise.

A description of any process or method in the flowcharts or described herein in another manner can be construed as one or more modules, fragments, or parts that include executable instructions used to implement a specific logical function or steps of a process. In addition, the scope of the preferred implementation manners of the present invention includes another implementation, where functions can be performed not in an order shown or discussed, including performing the functions basically at the same time or in reverse order according to the functions involved. This should be understood by a person skilled in the technical field to which the embodiments of the present invention belong.

Logic and/or steps shown in the flowcharts or described herein in other manners, for example, may be considered as a program list of executable instructions that are used to implement logic functions, and may be specifically implemented on any computer-readable medium, for an instruction execution system, apparatus, or device (for example, a computer-based system, a system including a processor, or another system that can fetch instructions from the instruction execution system, apparatus, or device and execute the instructions) to use, or for a combination of the instruction execution system, apparatus, or device to use. In terms of the specification, the "computer-readable medium" may be any apparatus that may include, store, communicate, propagate, or transmit programs, for the instruction execution system, apparatus, or device to use, or for a combination of the instruction execution system, apparatus, or device to use. More specific examples (this list is not exhaustive) of the computer-readable medium include the following: an electrical portion (an electrical apparatus) with one or more buses, a portable computer cartridge (a magnetic apparatus), a random-access memory (RAM), a read-only memory (ROM), an electrically erasable programmable read-only memory (EPROM or flash memory), an optical fiber apparatus, and a compact disc read-only memory (CDROM). In addition, the computer-readable medium may even be a piece of paper on which the programs can be printed or another appropriate medium. Because, for example, optical scanning may be performed on the paper or the another medium, then processing, such as edition, decoding, or another appropriate means when necessary, may be performed to obtain the programs in an electrical manner, and then the programs are stored in a computer memory.

It should be understood that, parts in the present invention may be implemented by using hardware, software, firmware, or a combination thereof. In the foregoing implementation manners, multiple steps or methods may be implemented by using software or firmware that is stored in a memory and is executed by an appropriate instruction execution system. For example, if hardware is used for implementation, being similar to implementation in another implementation manner, any item or a combination of the following well-known technologies in the art may be used for implementation: a discreet logic circuit having a logic gate circuit that is used to implement a logic function for a data signal, an application-specific integrated circuit having an appropriate combinatorial logic circuit, a programmable gate array (PGA), a field programmable gate array (FPGA), and the like.

A person of ordinary skill in the art may understand that all or some of the steps of the method embodiments may be implemented by a program instructing relevant hardware. The program may be stored in a computer readable storage medium. When the program runs, one or a combination of the steps of the method embodiments are performed.

In addition, functional units in the embodiments of the present invention may be integrated into one processing module, or each of the units may exist alone physically, or two or more units are integrated into one module. The integrated module may be implemented in a form of hardware, or may be implemented in a form of a software functional module. When the integrated module is implemented in the form of a software functional module and sold or used as an independent product, the integrated unit may be stored in a computer-readable storage medium.

The foregoing storage medium may be a read-only memory, a magnetic disk or an optical disk. Although the embodiments of the present invention are shown and described above, it can be understood that, the foregoing embodiments are exemplary, and cannot be construed as a limitation to the present invention. Within the scope of the present invention, a person of ordinary skill in the art may make changes, modifications, replacement, and variations to the foregoing embodiments.

What is claimed is:

1. A method, comprising:
receiving, by a first application on a first operating system on a terminal device, request information sent by a second application on a second operating system on the terminal device, wherein the request information carries association information of the second application, and wherein the first operating system comprises a first network interface and the second operating system comprises a second network interface;
receiving, by the first application, a first message from an external network using the first network interface;
extracting, by the first application, first information from the first message according to the association information of the second application; and
sending the first information to the second application, requesting that the second application send, using the second network interface, the first information to an application server corresponding to the second application.

2. The method according to claim 1, wherein receiving the request information comprises:
receiving, by the first application, request information sent by a third application corresponding to the second application, wherein the request information carries association information of the third application.

3. The method according to claim 2, wherein extracting the first information from the first message comprises:
extracting, by the first application, the first information from the first message according to the association information of the third application, and sending the first information to the third application, requesting that the third application send, using a third network interface, the first information to an application server corresponding to the third application, wherein the third application is running in the first operating system, and wherein the first operating system further comprises the third network interface.

4. The method according to claim 3, wherein sending the first information to the third application comprises:
sending, by the first application, the first information to the third application, requesting that the third application send, using the third network interface, the first information to the application server corresponding to the third application, so that the application server corresponding to the third application can verify the first information and send verification response information to the third application, and so that the third application can perform a payment operation according to the verification response information.

5. The method according to claim 1, wherein the method further comprises:
   determining, by the first application, whether a second message from the external network is received by the first network interface; and
   sending, by the first application, the second message to a fourth application, in response to determining that the second message is received, wherein the fourth application is running in the second operating system.

6. The method according to claim 5, wherein determining whether the second message is received comprises:
   determining, by the first application, whether the second message is received by the first network interface, after the request information sent by the second application is received.

7. The method according to claim 1, wherein the request information carries information about a preset time threshold, and wherein receiving the first message comprises:
   receiving, by the first application using the first network interface, a short message service (SMS) message that is sent from the external network within the preset time threshold.

8. A terminal device, comprising:
   a processor; and
   a non-transitory computer readable storage medium storing a program for execution by the processor, the program including instructions to:
      receive, by a first application on a first operating system, request information sent by a second application on a second operating system, wherein the request information carries association information of the second application, wherein the processor is running the first operating system, and wherein the first operating system comprises a first network interface and the second operating system comprises a second network interface;
      receive a first message from an external network using the first network interface;
      extract first information from the first message according to the association information of the second application; and
      send, by the first application, the first information to the second application, requesting that the second application send, by the second network interface, the first information to an application server corresponding to the second application.

9. The terminal device according to claim 8, wherein the instructions further comprise instructions to:
   receive, by the first application, request information sent by a third application corresponding to the second application, wherein the request information carries association information of the third application.

10. The terminal device according to claim 9, wherein the instructions further comprise instructions to:
    send the first information to the third application, requesting that the third application send, by a third network interface, the first information to the application server corresponding to the third application, so that the application server corresponding to the third application can verify the first information and send verification response information to the third application, and so that the third application can perform a payment operation according to the verification response information.

11. The terminal device according to claim 10, wherein the instructions further comprise instructions to:
    determine whether a second message is received by the first network interface, after the request information sent by the second application is received.

12. The terminal device according to claim 8, wherein the instructions further comprise instructions to:
    determine whether a second message from the external network is received by the first network interface; and
    send the second message to a fourth application, in response to determining that the second message is received, wherein the fourth application is running in the second operating system.

13. The terminal device according to claim 8, wherein the request information carries information about a preset time threshold, and wherein the instructions further comprise instructions to:
    receive, using the first network interface, a short message service (SMS) message that is sent from the external network within the preset time threshold.

14. A terminal device, comprising:
    a processor; and
    a non-transitory computer readable storage medium storing a program for execution by the processor, the program including instructions to:
       send, by a second application on a second operating system, request information to a first application on a first operating system, wherein the second operating system is running on the processor, wherein the first operating system comprises a first network interface and the second operating system comprises a second network interface, and wherein the request information carries association information of the processor, requesting that the first application receive a first message from an external network using the first network interface, and that the first application extract first information from the first message according to the association information of the processor, and that the first application send the first information to the second application;
       receive, by the second application, the first information sent by the first application; and
       send, by the second application using the second network interface, the first information to an application server corresponding to the processor.

15. The terminal device according to claim 14, wherein the instructions further comprise instructions to:
    extract, by the second application, the first information from the first message according to the association information of a third application; and
    send, by the second application, the first information to the third application, requesting that that the third application send, using a third network interface, the first information to an application server corresponding to the third application, wherein the third application is running in the first operating system, and the first operating system further comprises the third network interface.

16. The terminal device according to claim 14, wherein the instructions further comprise instructions to:
    establish a session connection between the second application and a corresponding third application, so that the third application can send request information to the first application, wherein the request information carries association information of the third application, and wherein the third application is running in the first operating system.

17. The terminal device according to claim 14, wherein the instructions further comprise instructions to:

establish a session connection between the second application and a corresponding third application, so that the third application can send request information to the first application, wherein the request information carries association information of the third application, so that the first application can extract the first information from the first message according to the association information of the third application, and the first application can send the first information to the third application, and the third application can send, using a third network interface, the first information to an application server corresponding to the third application, wherein the first operating system further comprises the third network interface.

18. The terminal device according to claim 14, wherein the instructions further comprise instructions to:
establish a session connection between the second application and a corresponding third application, so that the third application can send request information to the first application, wherein the request information carries association information of the third application, so that the first application can extract the first information from the first message according to the association information of the third application, and so that the first application can send the first information to the third application, so that the third application can send, using a third network interface, the first information to an application server corresponding to the third application, so that the application server corresponding to the third application can verify the first information and send verification response information to the third application, and so that the third application can perform a payment operation according to the verification response information.

19. The terminal device according to claim 18, wherein the first operating system is a trusted execution environment (TEE), and wherein the instructions further comprise instructions to:
establish the session connection between the first application and the second application using a TEE Client application programming interface (API).

20. The terminal device according to claim 14, wherein the instructions further comprise instructions to:
establish a session connection between the first application and the second application, before sending request information to the first application; and
disrupt the session connection between the first application and the second application after receiving the first information sent by the first application.

\* \* \* \* \*